(12) United States Patent
Jiang et al.

(10) Patent No.: US 9,241,322 B2
(45) Date of Patent: Jan. 19, 2016

(54) ENHANCED LTE POSITIONING PROTOCOL INFORMATION TRANSFER PROCEDURES FOR CONTROL PLANE LCS ON LTE

(71) Applicant: QUALCOMM Incorporated, San Diego, CA (US)

(72) Inventors: Yongjin Jiang, San Diego, CA (US); Rui He, San Jose, CA (US); Stephen William Edge, Escondido, CA (US); Kirk Allan Burroughs, Alamo, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/604,386

(22) Filed: Jan. 23, 2015

(65) Prior Publication Data

US 2015/0141049 A1   May 21, 2015

Related U.S. Application Data

(63) Continuation of application No. 13/779,626, filed on Feb. 27, 2013, now Pat. No. 8,971,920.

(60) Provisional application No. 61/699,543, filed on Sep. 11, 2012, provisional application No. 61/705,118, filed on Sep. 24, 2012.

(51) Int. Cl.
*H04W 4/02* (2009.01)
*H04W 64/00* (2009.01)
*H04L 1/18* (2006.01)

(52) U.S. Cl.
CPC .............. *H04W 64/00* (2013.01); *H04L 1/188* (2013.01)

(58) Field of Classification Search
CPC ................................... H04W 4/025
USPC .......... 455/456.5, 456.1, 456.6, 404.2, 412.1, 455/414.4, 432.2; 370/310.1, 395.5
See application file for complete search history.

(56) References Cited

U.S. PATENT DOCUMENTS 5,165,020 A    11/1992   Sudama et al.
6,751,453 B2    6/2004   Schemers et al.

(Continued)

FOREIGN PATENT DOCUMENTS

EP       2466778 A1       6/2012
WO       0241498 A2       5/2002
WO       2011128504 A1   10/2011

OTHER PUBLICATIONS

3GPP TS 36.355 V9.8.0 (Dec. 2011), 3rd Generation Partnership Project; Technical Specification Group Radio Access Network; Evolved Universal Terrestrial Radio Access (E-UTRA); LTE Positioning Protocol (LPP) (Release 9), pp. 1-115.

(Continued)

*Primary Examiner* — Cong Tran
(74) *Attorney, Agent, or Firm* — Hunter Clark PLLC

(57) ABSTRACT

Techniques disclosed herein provide for enhanced LTE Positioning Protocol (LPP) Reliable Transport where the receiver of an LPP message sends a non-piggybacked acknowledgement. An example method for executing on a mobile device a protocol session with a location server includes sending a first protocol session message associated with a first protocol session to the location server, entering a wait-for-acknowledgement state in which uplink transmissions from the mobile device to the location server are suspended while waiting for an acknowledgement from the location server in response to the first protocol session message, receiving a second protocol session message associated with a second protocol session which is not an acknowledgement to the first protocol session message but includes information requested in the first protocol session message; exiting the wait-for-acknowledgement state responsive to receiving the second protocol session message; and performing an action using the information received in the second protocol session message.

20 Claims, 13 Drawing Sheets

(56) References Cited

U.S. PATENT DOCUMENTS

| | | |
|---|---|---|
| 7,103,018 B1 | 9/2006 | Hansen et al. |
| 8,725,831 B2 | 5/2014 | Barbeau et al. |
| 2005/0286504 A1 | 12/2005 | Kwon |
| 2006/0120320 A1 | 6/2006 | Shim |
| 2011/0013589 A1 | 1/2011 | Wu |
| 2011/0039583 A1* | 2/2011 | Frank .................... H04W 64/00 455/456.5 |
| 2011/0244889 A1 | 10/2011 | Kone |
| 2011/0281592 A1* | 11/2011 | Tamura ............. H04W 52/0225 455/456.5 |
| 2012/0147732 A1 | 6/2012 | Chien et al. |
| 2013/0122941 A1* | 5/2013 | Das ........................ H04W 4/04 455/456.5 |
| 2013/0303198 A1* | 11/2013 | Sadasivam ............ H04W 4/023 455/456.5 |
| 2013/0346217 A1* | 12/2013 | Pandey .................. G06Q 30/02 705/14.68 |
| 2014/0073347 A1 | 3/2014 | Yongjin et al. |

OTHER PUBLICATIONS

International Search Report and Written Opinion—PCT/US2013/051448—ISA/EPO—Jan. 3, 2014.
International Preliminary Report on Patentability—PCT/US2013/051448—The International Bureau of WIPO—Geneva, Switzerland, Mar. 26, 2015, 5 pgs.

* cited by examiner

Location Server

ENHANCED LTE POSITIONING PROTOCOL INFORMATION TRANSFER PROCEDURES FOR CONTROL PLANE LCS ON LTE

CLAIM OF PRIORITY UNDER 35 U.S.C. 119

This application is a continuation of U.S. application Ser. No. 13/779,626, filed Feb. 27, 2013, and entitled "ENHANCED LTE POSITIONING PROTOCOL INFORMATION TRANSFER PROCEDURES FOR CONTROL PLANE LCS ON LTE," which claims priority to and the benefit of U.S. Provisional Patent Application Ser. No. 61/699,543, entitled "ENHANCED LTE POSITIONING PROTOCOL INFORMATION TRANSFER PROCEDURES FOR CONTROL PLANE LCS ON LTE," filed on Sep. 11, 2012, and U.S. Provisional Patent Application Ser. No. 61/705,118, entitled "ENHANCED LTE POSITIONING PROTOCOL INFORMATION TRANSFER PROCEDURES FOR CONTROL PLANE LCS ON LTE," filed on Sep. 24, 2012, all of which are assigned to the assignee hereof and incorporated by reference.

BACKGROUND

1. Field of the Invention

The present disclosure relates generally to positioning protocols, and more specifically to techniques for providing improved reliability in positioning protocols using non-piggybacked acknowledgements.

2. Related Art

The Long Term Evolution (LTE) standards for wireless communication are being developed by the 3rd Generation Partnership Project (3GPP). In the 3GPP TS 36.355 specification, which defines the LTE Positioning Protocol (LPP), the LPP Reliable Transport requirements for the transport layers are defined. LPP Reliable Transport specifications include requirements for duplicate message detection, acknowledgement, and retransmission of messages. The LPP specifications require that the User Equipment (UE) support LPP Reliable Transport.

The acknowledgement procedure set out in the TS 36.355 specification includes the following stages:

Upon reception of an LPP message which requests acknowledgement, a receiver returns an LPP message with an acknowledgement response that includes the sequence number of the message to be acknowledged.

An acknowledgement response may contain no LPP message body (also referred to herein as a "non-piggybacked LPP acknowledgement"). Alternatively, the acknowledgement may be sent in an LPP message along with an LPP message body (also referred to herein as a "piggybacked LPP acknowledgement").

Once the sender receives an acknowledgement for an LPP message, and provided any included sequence number is matching, the sender is permitted to send the next LPP message.

When an LPP message which requires acknowledgement is sent and not acknowledged, the LPP message is resent up to three times by the sender following a timeout period. If still unacknowledged after that, the sender aborts all LPP activity for the associated session.

The sender of the LPP message requiring acknowledgement enters a "wait for acknowledgement" state while waiting for the acknowledgement to be received in which the sender cannot transmit subsequent messages that include an LPP message body. When the acknowledgement is sent by the receiver of the message, but is lost in transit to the sender, the sender can become stuck in the wait-for-acknowledgement state until the timeout occurs.

SUMMARY

An example method for executing on a mobile device a protocol session with a location server using a protocol with mechanisms that allow for transport of protocol messages over a non-reliable link according to the disclosure includes: sending a first protocol session message associated with a first protocol session to the location server, entering a wait-for-acknowledgement state in which uplink transmissions from the mobile device to the location server are suspended while waiting for an acknowledgement from the location server in response to the first protocol session message, receiving a second protocol session message associated with a second protocol session, the second protocol session message not being the acknowledgement from the location server in response to the first protocol session message, the second protocol session message including information requested in the first protocol session message, exiting the wait-for-acknowledgement state responsive to receiving the second protocol session message, and performing an action using the information received in the second protocol session message.

Implementations of such a method may include one or more of the following features. The first protocol session message is an LTE Positioning Protocol (LPP) Request Assistance Data message and the second protocol session message is an LPP Provide Assistance Data message. The first protocol session message is an LPP Request Assistance Data message and the second protocol session message is an LPP Error message or an LPP Abort message. The first protocol session message includes a request for information from the location server and the second protocol session message includes the information from the location server. Comparing a first transaction ID associated with the first protocol session message to a second transaction ID associated with the second protocol session message, and exiting the wait-for-acknowledgement state responsive to receiving the second protocol session message only if the first transaction ID matches the second transaction ID. Resending the first protocol session message to the location server if neither the acknowledgement from the location server in response to the first protocol session message nor the second protocol session message is received by the mobile device prior to expiration of a retransmission timer.

An example apparatus for executing on a mobile device a protocol session with a location server using a protocol with mechanisms that allow for transport of protocol messages over a non-reliable link according to the disclosure includes: means for sending a first protocol session message associated with a first protocol session to the location server, means for entering a wait-for-acknowledgement state in which uplink transmissions from the mobile device to the location server are suspended while waiting for an acknowledgement from the location server in response to the first protocol session message, means for receiving a second protocol session message associated with a second protocol session, the second protocol session message not being the acknowledgement from the location server in response to the first protocol session message, the second protocol session message including information requested in the first protocol session message, means for exiting the wait-for-acknowledgement state responsive to receiving the second protocol session message, and means for performing an action using the information received in the second protocol session message.

Implementations of such an apparatus may include one or more of the following features. The first protocol session message is an LTE Positioning Protocol (LPP) Request Assistance Data message and the second protocol session message is an LPP Provide Assistance Data message. The first protocol session message is an LPP Request Assistance Data message and the second protocol session message is an LPP Error message or an LPP Abort message. The first protocol session message includes a request for information from the location server and the second protocol session message includes the information from the location server. Means for comparing a first transaction ID associated with the first protocol session message to a second transaction ID associated with the second protocol session message, and means for exiting the wait-for-acknowledgement state responsive to receiving the second protocol session message only if the first transaction ID matches the second transaction ID. Means for resending the first protocol session message to the location server if neither the acknowledgement from the location server in response to the first protocol session message nor the second protocol session message is received by the mobile device prior to expiration of a retransmission timer.

An example apparatus for executing on a mobile device a protocol session with a location server using a protocol with mechanisms that allow for transport of protocol messages over a non-reliable link according to the disclosure includes: a transceiver configured to transmit and receive data wirelessly, a memory configured to store processor-executable program code, and a processor. The processor is configured to send a first protocol session message associated with a first protocol session to the location server, enter a wait-for-acknowledgement state in which uplink transmissions from the mobile device to the location server are suspended while waiting for an acknowledgement from the location server in response to the first protocol session message, receive a second protocol session message associated with a second protocol session, the second protocol session message not being the acknowledgement from the location server in response to the first protocol session message, the second protocol session message including information requested in the first protocol session message, exit the wait-for-acknowledgement state responsive to receiving the second protocol session message, and perform an action using the information received in the second protocol session message.

Implementations of such an apparatus may include one or more of the following features. The first protocol session message is an LTE Positioning Protocol (LPP) Request Assistance Data message and the second protocol session message is an LPP Provide Assistance Data message. The first protocol session message is an LPP Request Assistance Data message and the second protocol session message is an LPP Error message or an LPP Abort message. The first protocol session message includes a request for information from the location server and the second protocol session message includes the information from the location server. The processor is further configured to: compare a first transaction ID associated with the first protocol session message to a second transaction ID associated with the second protocol session message, and exit the wait-for-acknowledgement state responsive to receiving the second protocol session message only if the first transaction ID matches the second transaction ID. The processor is further configured to resend the first protocol session message to the location server if neither the acknowledgement from the location server in response to the first protocol session message nor the second protocol session message is received by the mobile device prior to expiration of a retransmission timer.

An example A non-transitory computer-readable medium, having stored thereon computer-readable instructions for executing on a mobile device a protocol session with a location server using a protocol with mechanisms that allow for transport of protocol messages over a non-reliable link, according to the disclosure includes instructions configured to cause a computer to: send a first protocol session message associated with a first protocol session to the location server, enter a wait-for-acknowledgement state in which uplink transmissions from the mobile device to the location server are suspended while waiting for an acknowledgement from the location server in response to the first protocol session message, receive a second protocol session message associated with a second protocol session, the second protocol session message not being the acknowledgement from the location server in response to the first protocol session message, the second protocol session message including information requested in the first protocol session message, exit the wait-for-acknowledgement state responsive to receiving the second protocol session message, and perform an action using the information received in the second protocol session message.

Implementations of such a non-transitory computer-readable medium may include one or more of the following features. The first protocol session message is an LTE Positioning Protocol (LPP) Request Assistance Data message and the second protocol session message is an LPP Provide Assistance Data message. The first protocol session message is an LPP Request Assistance Data message and the second protocol session message is an LPP Error message or an LPP Abort message. The first protocol session message includes a request for information from the location server and the second protocol session message includes the information from the location server. Instructions configured to cause the computer to: compare a first transaction ID associated with the first protocol session message to a second transaction ID associated with the second protocol session message, and exit the wait-for-acknowledgement state responsive to receiving the second protocol session message only if the first transaction ID matches the second transaction ID. Instructions configured to cause the computer to resend the first protocol session message to the location server if neither the acknowledgement from the location server in response to the first protocol session message nor the second protocol session message is received by the mobile device prior to expiration of a retransmission timer.

An example method for executing on a location server a protocol session with a mobile device using a protocol with mechanisms that allow for transport of protocol messages over a non-reliable link according to the disclosure includes: sending a first protocol session message associated with a first protocol session to the mobile device, entering a wait-for-acknowledgement state in which downlink transmissions from the location server to the mobile device are suspended while waiting for an acknowledgement from the mobile device in response to the first protocol session message, receiving a second protocol session message associated with a second protocol session, the second protocol session message not being the acknowledgement from the mobile device in response to the first protocol session message, the second protocol session message including information requested in the first protocol session message, exiting the wait-for-acknowledgement state responsive to receiving the second protocol session message, and performing an action using the information received in the second protocol session message.

Implementations of such a method may include one or more of the following features. The protocol session message includes a request for information from the mobile device and the second protocol session message includes the information from the mobile device. Resending the first protocol session message to the mobile device if neither the acknowledgement from the mobile device in response to the first protocol session message nor the second protocol session message is received by the mobile device prior to expiration of a retransmission timer. Comparing a first transaction ID associated with the first protocol session message to a second transaction ID associated with the second protocol session message, and exiting the wait-for-acknowledgement state responsive to receiving the second protocol session message only if the first transaction ID matches the second transaction ID. The first protocol session message is an LTE Positioning Protocol (LPP) Provide Assistance Data message and the second protocol session message is an LPP Provide Location Information message.

An example apparatus for executing on a location server a protocol session with a mobile device using a protocol with mechanisms that allow for transport of protocol messages over a non-reliable link according to the disclosure includes: means for sending a first protocol session message associated with a first protocol session to the mobile device, means for entering a wait-for-acknowledgement state in which downlink transmissions from the location server to the mobile device are suspended while waiting for an acknowledgement from the mobile device in response to the first protocol session message, means for receiving a second protocol session message associated with a second protocol session, the second protocol session message not being the acknowledgement from the mobile device in response to the first protocol session message, the second protocol session message including information requested in the first protocol session message, means for exiting the wait-for-acknowledgement state responsive to receiving the second protocol session message, and means for performing an action using the information received in the second protocol session message.

Implementations of such an apparatus may include one or more of the following features. The protocol session message includes a request for information from the mobile device and the second protocol session message includes the information from the mobile device. Means for resending the first protocol session message to the mobile device if neither the acknowledgement from the mobile device in response to the first protocol session message nor the second protocol session message is received by the mobile device prior to expiration of a retransmission timer. Means for comparing a first transaction ID associated with the first protocol session message to a second transaction ID associated with the second protocol session message, and means for exiting the wait-for-acknowledgement state responsive to receiving the second protocol session message only if the first transaction ID matches the second transaction ID. The first protocol session message is an LTE Positioning Protocol (LPP) Provide Assistance Data message and the second protocol session message is an LPP Provide Location Information message.

An example apparatus for executing on a location server a protocol session with a mobile device using a protocol with mechanisms that allow for transport of protocol messages over a non-reliable link according to the disclosure includes: a network interface configured to transmit and receive data via one or more networks, a memory configured to store processor-executable program code; and a processor. The processor is configured to: send a first protocol session message associated with a first protocol session to the mobile device, enter a wait-for-acknowledgement state in which downlink transmissions from the location server to the mobile device are suspended while waiting for an acknowledgement from the mobile device in response to the first protocol session message, receive a second protocol session message associated with a second protocol session, the second protocol session message not being the acknowledgement from the mobile device in response to the first protocol session message, the second protocol session message including information requested in the first protocol session message, exit the wait-for-acknowledgement state responsive to receiving the second protocol session message; and perform an action using the information received in the second protocol session message.

Implementations of such an apparatus may include one or more of the following features. The protocol session message includes a request for information from the mobile device and the second protocol session message includes the information from the mobile device. Resend the first protocol session message to the mobile device if neither the acknowledgement from the mobile device in response to the first protocol session message nor the second protocol session message is received by the mobile device prior to expiration of a retransmission timer. Compare a first transaction ID associated with the first protocol session message to a second transaction ID associated with the second protocol session message, and exit the wait-for-acknowledgement state responsive to receiving the second protocol session message only if the first transaction ID matches the second transaction ID. The first protocol session message is an LTE Positioning Protocol (LPP) Provide Assistance Data message and the second protocol session message is an LPP Provide Location Information message.

An example non-transitory computer-readable medium, having stored thereon computer-readable instructions for executing on a location server a protocol session with a mobile device using a protocol with mechanisms that allow for transport of protocol messages over a non-reliable link, according to the disclosure includes instructions configured to cause a computer to: send a first protocol session message associated with a first protocol session to the mobile device, enter a wait-for-acknowledgement state in which downlink transmissions from the location server to the mobile device are suspended while waiting for an acknowledgement from the mobile device in response to the first protocol session message, receive a second protocol session message associated with a second protocol session, the second protocol session message not being the acknowledgement from the mobile device in response to the first protocol session message, the second protocol session message including information requested in the first protocol session message, exit the wait-for-acknowledgement state responsive to receiving the second protocol session message, and perform an action using the information received in the second protocol session message.

Implementations of such a non-transitory computer-readable medium may include one or more of the following features. The protocol session message includes a request for information from the mobile device and the second protocol session message includes the information from the mobile device. Instructions to cause the computer to resend the first protocol session message to the mobile device if neither the acknowledgement from the mobile device in response to the first protocol session message nor the second protocol session message is received by the mobile device prior to expiration of a retransmission timer. Instructions to cause the computer to: compare a first transaction ID associated with the first protocol session message to a second transaction ID associated with the second protocol session message, and exit the wait-for-acknowledgement state responsive to receiving the second protocol session message only if the first transaction ID matches the second transaction ID. The first protocol session message is an LTE Positioning Protocol (LPP) Provide Assistance Data message and the second protocol session message is an LPP Provide Location Information message.

Items and/or techniques described herein may provide one or more of the following capabilities, as well as other capabilities not mentioned.

DETAILED DESCRIPTION

Techniques disclosed herein provide for enhanced LTE Positioning Protocol (LPP) Reliable Transport that can enhance performance where the receiver of an LPP message sends a non-piggybacked acknowledgement. These techniques can prevent a sender from becoming stuck in a wait-for-acknowledgement state when the non-piggybacked acknowledgement to the sender's message is lost by accepting a substitute/implicit acknowledgement. Techniques discussed herein can be used with other protocols including LPP/LPPe (LPP extension).

Example Network Environment

Figure 1:
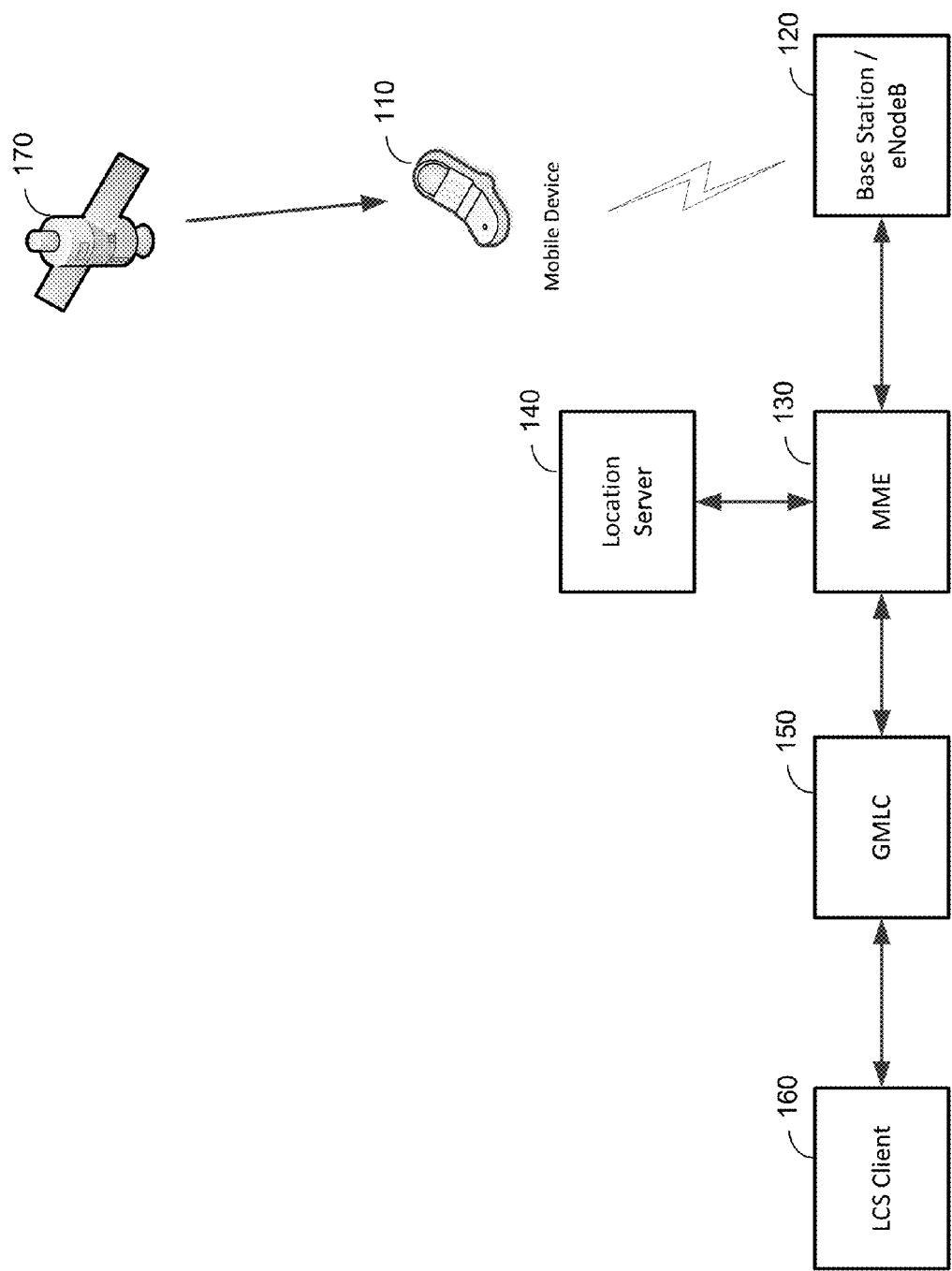
FIG. 1 is a block diagram of an example network architecture in which the techniques discussed herein can be implemented.

FIG. 1 is a block diagram of a first network architecture 100, which may be suitable for an LTE network and for implementing the techniques discussed herein. The first network architecture 100 includes a mobile device 110, which may also be referred to as a User Equipment (UE), a mobile station, a terminal, an access terminal, a subscriber unit, a station, etc. The mobile device 110 may be a cellular phone, a personal digital assistant (PDA), a wireless device, a wireless modem, a wireless router, a laptop computer, a telemetry device, a tracking device, etc. The mobile device 110 may communicate with a base station 120, also referred to herein as a eNodeB (eNB), in a radio access network (RAN) to obtain communication services. The RAN may include other network entities not shown in FIG. 1 for simplicity and may also be referred to as an Evolved Universal Terrestrial Radio Access Network (E-UTRAN). The base station 120 may also be referred to as a Node B, an access point, etc.

The mobile device 110 may also receive and measure signals from one or more satellites 170 and obtain pseudo-range measurements for the satellites. Satellites 170 may be part of a Global Navigation Satellite System (GNSS), which may be the United States Global Positioning System (GPS), the European Galileo system, the Russian GLONASS system, or some other GNSS. The mobile device 110 may also measure signals from eNBs, such as base station 120, and obtain timing measurements (e.g., for time of arrival (TOA) or observed time difference of arrival (OTDOA)), signal strength measurements, and/or signal quality measurements for the eNBs. The pseudo-range measurements, timing measurements, signal strength measurements, and/or signal quality measurements may be used to derive a location estimate for mobile device 110. A location estimate may also be referred to as a position estimate, a position fix, etc.

The base station 120 may communicate with a Mobility Management Entity (MME) 130, which may perform various control functions such as mobility management, gateway selection, authentication, bearer management, etc. The MME 130 may communicate with a location server 140. The location server 140 can be an Evolved Serving Mobile Location Center (E-SMLC) 140. The MME 130 can also communicate with a Gateway Mobile Location Center (GMLC) 150. The location server 140 may support mobile device-based, mobile device-assisted, network-based and/or network-assisted positioning methods and may support one or more MMEs. The location server 140 may also be referred to as a standalone SMLC (SAS), etc. The location server 140 may also communicate with the GMLC 150 to support location services. The GMLC 150 may perform various functions to support location services, interface with external location services (LCS) clients, such as LCS client 160, and provide services such as subscriber privacy, authorization, authentication, billing, etc. The GMLC 150 may include a Home GMLC (H-GMLC), a Visited GMLC (V-GMLC), and/or a Requesting GMLC (R-GMLC). The H-GMLC, V-GMLC, and R-GMLC are not illustrated in FIG. 1 as they are not necessary for illustrating the techniques disclosed herein.

The example network configuration illustrated in FIG. 1 is merely an example of one possible configuration of a network in which the techniques disclosed herein may be implemented. Other network configurations may include additional elements not illustrated in FIG. 1 and the various components may be interconnected in a different configuration than what is shown in FIG. 1.

Example Embodiments

Figure 2:
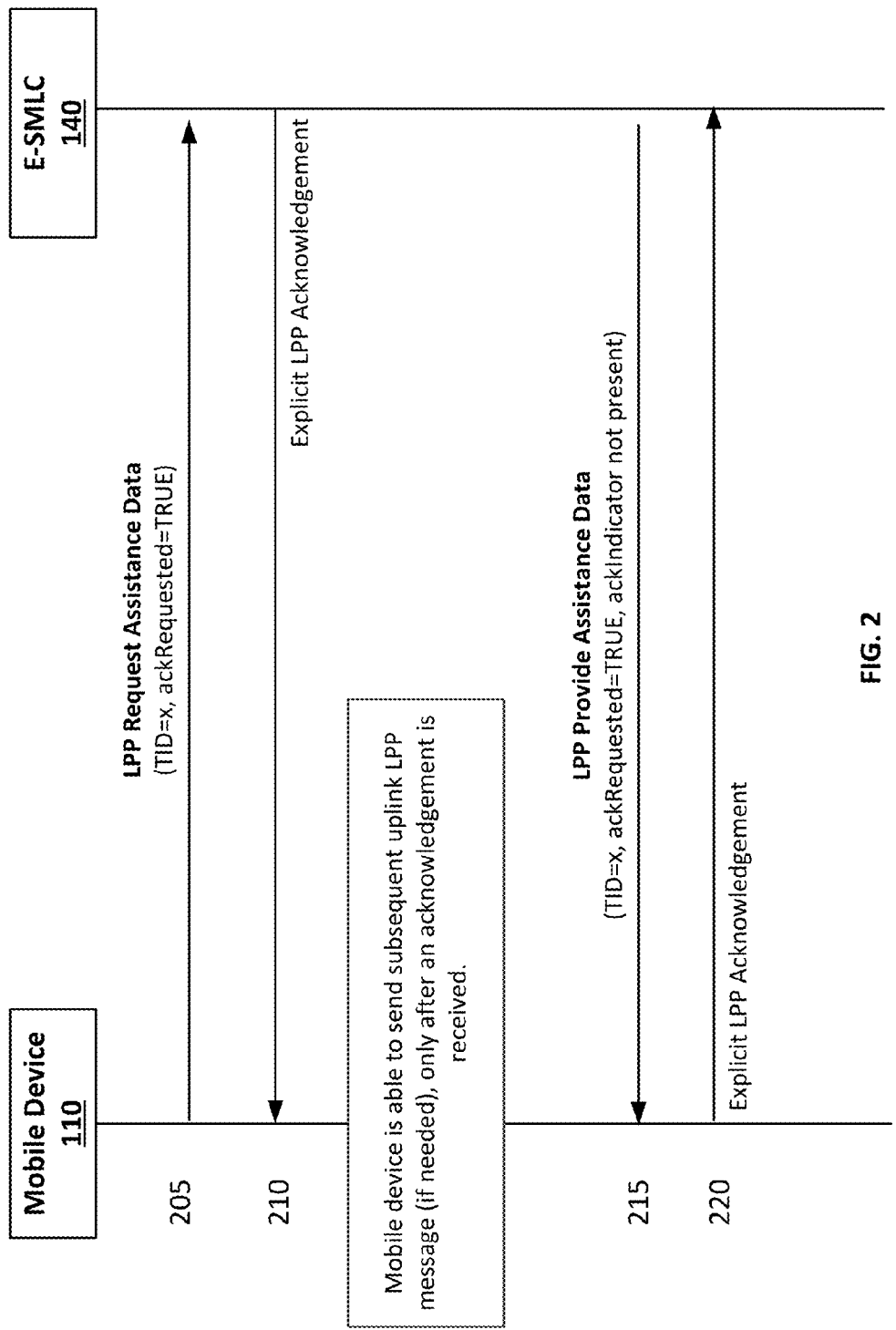
FIG. 2 illustrates an example call flow for a mobile device-initiated Assistance Data Transfer that illustrates what should occur when the non-piggybacked LPP Acknowledgement message is not lost.

FIG. 2 provides an example call flow for a mobile device-initiated Assistance Data Transfer that illustrates what should occur when a non-piggybacked LPP Acknowledgement message is not lost. The mobile device-initiated Assistance Data Transfer procedure illustrated in FIG. 2 illustrates signaling that occurs between the mobile device 110 and the location server 140 (also referred to herein as a Location Server).

The call flow for the mobile device-initiated Assistance Data Transfer illustrated in FIG. 2 includes the following stages:

Stage 205: The mobile device 110 sends an LPP Request Assistance Data message to the Location Server that requires acknowledgement from the Location Server.

Stage 210: The location server 140 responds with a non-piggybacked acknowledgement.

Stage 215: When the requested Assistance Data is ready, the location server 140 can send an LPP Provide Assistance Data message to the mobile device 110 that includes the requested Assistance Data.

Stage 220: The mobile device 110 responds with a non-piggybacked acknowledgement.

For a typical mobile device 110 implementation, after stage 205, the mobile device 110 enters a wait-for-acknowledgement state in which the mobile device 110 waits for the acknowledgement from the location server 140. However, the non-piggybacked acknowledgment sent to the mobile device 110 by the location server 140 may be lost, causing the mobile device 110 to become stuck in the wait-for-acknowledgement state. For example, the non-piggybacked acknowledgement might be lost due to a brief service interruption in the LTE transport layer during an eNodeB handover or due to MME 130 or base station 120 congestion.

The current acknowledgement procedure described in the TS 36.355 specification requires that, if no acknowledgement is received in response to the request message sent in stage 205, the mobile device 110 stays in the wait-for-acknowledgement state until a "timeout period" expiry at which time the mobile device 110 retransmits the LPP Request Assistance Data message to once again request the assistance data from the location server 140. Retransmission of the LPP Request Assistance Data message can be useful when the mobile device 110 is given a response time long enough to allow for retransmissions. However, many location-based service (LBS) applications are not very latency tolerant (e.g., the Enhanced 911 (E-911) emergency service used in North America may have a response time that is less than 30 seconds) and do not provide sufficient time for a retransmission of LPP Request Assistance Data messages. Even when sufficient time to retransmit LPP Request Assistance Data messages is available, unnecessary retransmissions introduce extra signaling load at the base station 120 and MME 130 on the LTE network that could impact the performance of LTE network.

While in the wait-for-acknowledgement state, the mobile device 110 cannot send subsequent uplink LPP messages that include a message body. However, the mobile device 110 can continue to receive downlink messages from the location server 140. The LPP standard does not forbid the mobile device 110 from receiving and acknowledging subsequent (downlink) LPP messages while waiting for the acknowledgement to the last (uplink) LPP message sent by the mobile device 110. As a result, the mobile device 110 can receive the LPP Provide Assistance Data message (stage 215) that carries the requested assistance data, even though the non-piggybacked acknowledgement transmitted by the location server 140 in stage 210 has been lost.

In response to receiving the LPP Provide Assistance Data message that includes the assistance data requested by the mobile device 110, the mobile device 110 is able to perform a positioning procedure to determine the location of the mobile device 110. But, because the mobile device 110 remains stuck in the wait-for-acknowledgement state, the mobile device 110 is not allowed according to the LPP standards to send the results of the positioning procedure to the location server 140. As a result, the positioning session can be considered to have failed, even though the mobile device 110 was able to estimate or measure the position of the mobile device 110 using the Assistance Data received from the location server 140 received in stage 215.

To avoid the deadlock problem where the mobile device 110 becomes stuck in the wait-for-acknowledgement state, the mobile device 110 can be configured to accept the LPP Provide Assistance Data message that includes the requested Assistance Data as a "substitute/implicit acknowledgement" for the lost non-piggybacked acknowledgement and the mobile device 110 can exit the wait-for-acknowledgement state and enable uplink LPP signaling. The LPP Provide Assistance Data message can serve as a substitute/implicit acknowledgement for the explicit LPP non-piggybacked acknowledgment sent by the location server 140 to the mobile device 110 in stage 210, because the LPP Provide Assistance Data message is provided in response to the LPP Request Assistance Data messages sent by the mobile device 110 to the location server 140 in stage 205. Receipt of the LPP Provide Assistance Data message by the mobile device 110 indicates that the location server 140 did receive the LPP Request Assistance Data message sent in stage 205, even though the explicit non-piggybacked acknowledgement sent by the location server 140 in stage 210 in response to the request was lost before the acknowledgement reached the mobile device 110. Accordingly, the mobile device 110 can exit the wait-for-acknowledgement state and continue with the positioning session. Examples of a target device, such as mobile device 110, being configured to accept a Substitute/Implicit Acknowledgement are provided in FIGS. 3 and 4.

Figure 3:
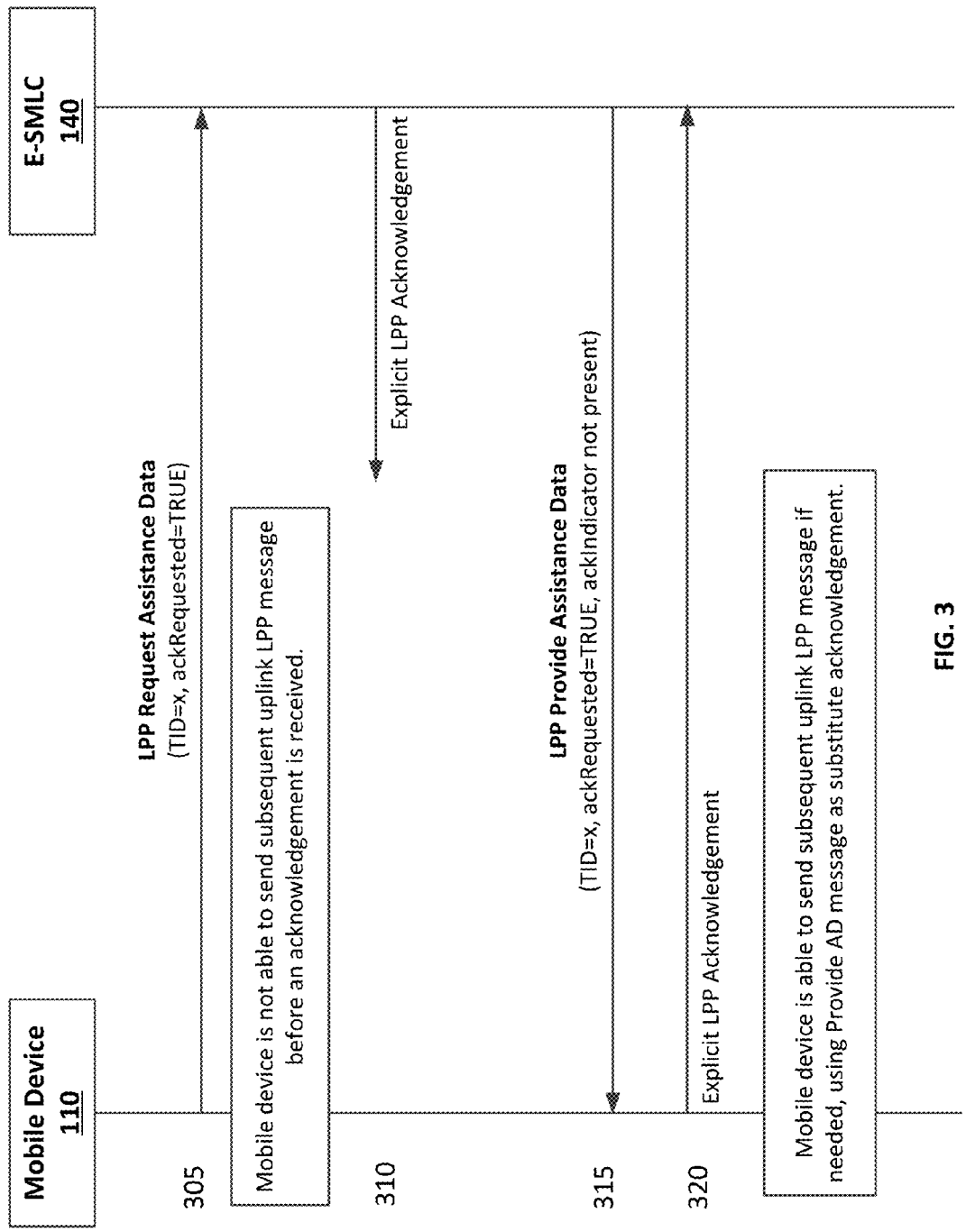
FIG. 3 illustrates an example call flow for a mobile device-initiated Assistance Data Transfer where the mobile device has been configured to accept the LPP Provide Assistance Data message from the Location Server as a substitute/implicit acknowledgement.
Figure 4:
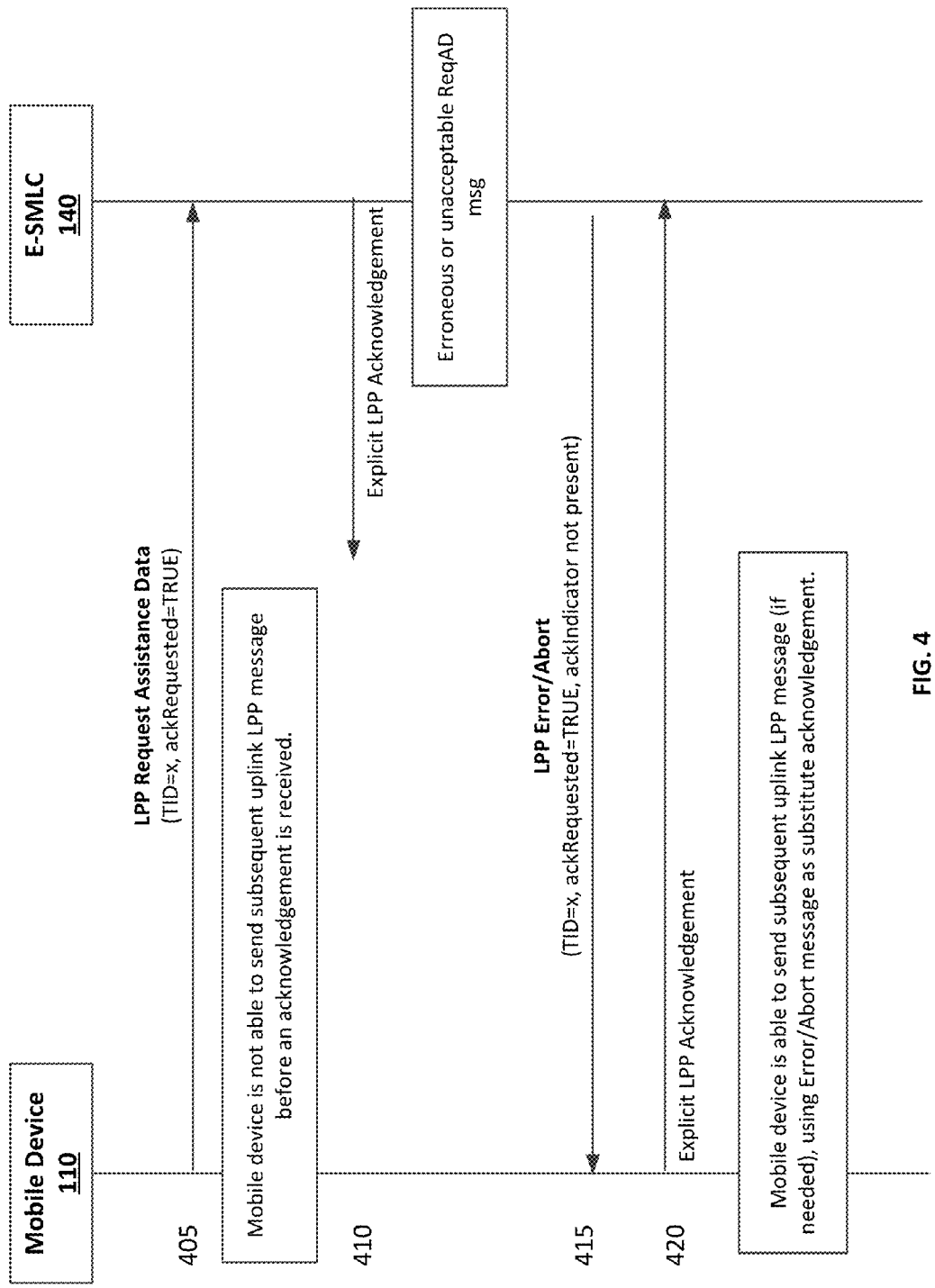
FIG. 4 illustrates an example call flow for a mobile device-initiated Assistance Data Transfer where the substitute/implicit acknowledgement can comprise an LPP Error Message or an LPP Abort Message.

FIGS. 3 and 4 are call flow diagrams that illustrate example process where the mobile device is configured to accept a subsequent downlink message as a substitute/implicit acknowledgment following the loss of a non-piggybacked acknowledgement. In these examples, the substitute/implicit acknowledgement is a response to a message.

FIG. 3 illustrates an example call flow for a mobile device-initiated Assistance Data Transfer where the mobile device 110 has been configured to accept the LPP Provide Assistance Data message from the location server 140 as a substitute/implicit acknowledgement.

Stage 305: The mobile device 110 sends an LPP Request Assistance Data message to the location server 140 that requires acknowledgement from the location server 140. The mobile device 110 enters the wait-for-acknowledgement state.

Stage 310: The location server 140 responds with a non-piggybacked acknowledgement, but the non-piggybacked acknowledgement is lost before it reaches the mobile device 110.

Stage 315: When the requested Assistance Data is ready, the location server 140 sends an LPP Provide Assistance Data message to the mobile device 110.

Stage 320: The mobile device 110 responds with a non-piggybacked acknowledgement. The mobile device 110 compares the Transaction ID included in the Provide Assistance Data Message to the Transaction ID included in the Request Assistance Data message, and the mobile device 110 exits the wait-for-acknowledgement state if the Transaction IDs match.

In the call flow illustrated in FIG. 3, the mobile device 110 can verify that the Transaction ID included in the Provide Assistance Data Message matches the Transaction ID included in the LPP Request Assistance Data message that the mobile device 110 sent to the Location Server. If the two Transaction IDs match, the mobile device 110 can be configured to accept the Provide Assistance Data message received from the Location Server as a substitute/implicit acknowledgement. Because the requested Assistance Data has been received, the mobile device 110 can assume that the Location Server received the LPP Request Assistance Data message even though the mobile device 110 never received the non-piggybacked acknowledgement from the Location Server. The mobile device 110 is then able to proceed with the call flow by sending subsequent uplink LPP messages as necessary.

The use of the substitute/implicit acknowledgement as described herein provides at least following technical advantages or benefits: 1) use of the substitute/implicit acknowledgement can prevent unnecessary hold-up on the uplink LPP signaling, by forcing the mobile device 110 to exit the wait-for-acknowledgement state, and 2) use of the substitute/implicit acknowledgement can improve the overall performance of LBS applications (especially to those that are less latency tolerant), by eliminating unnecessary retransmissions.

In the example illustrated FIG. 3, the mobile device 110 can be configured to use the Transaction ID associated with the Provide Assistance Data Message to determine that the Provide Assistance Data Message is associated with and provided in response to the LPP Request Assistance Data message sent in stage 305. In other implementations, other information may be used to determine that a particular message received at the mobile device 110 is provided in response to a request sent to the location server 140 by the mobile device 110. In some implementations, the mobile device 110 can be configured to accept the next LPP Provide Assistance Data message received from the location server 140 as a substitute/implicit acknowledgement or the next LPP Provide Assistance Data message received from the location server 140 within a predetermined time period of the mobile device 110 sending the LPP Request Assistance Data message as a substitute/implicit acknowledgement for an explicit non-piggybacked acknowledgement.

FIG. 4 illustrates an example call flow for a mobile device-initiated Assistance Data Transfer where the substitute/implicit acknowledgement can comprise an LPP Error Message or an LPP Abort Message.

Stage 405: The mobile device 110 sends an LPP Request Assistance Data message to the location server 140. The LPP Request Assistance Data message requires acknowledgement from the location server 140. The mobile device 110 enters the wait-for-acknowledgement state after sending the LPP Request Assistance Data message to the location server 140.

Stage 410: The location server 140 responds with a non-piggybacked acknowledgement, but the non-piggybacked acknowledgement is lost before it reaches the mobile device 110. (Note: stage 410 may not happen in the event that the location server 140 could not obtain needed information for the non-piggybacked acknowledgement from the LPP Request Assistance Data message.)

Stage 415: If there is a problem with the LPP Request Assistance Data received from the mobile device 110, the Location Server can transmit an LPP Error Message or an LPP Abort Message to the mobile device 110.

Stage 420: The mobile device 110 responds with a non-piggybacked acknowledgement. The mobile device 110 can then compare the Transaction ID included in the LPP Error Message or the LPP Abort Message to the Transaction ID included in the Request Assistance Data message and the mobile device 110 exits the wait-for-acknowledgement state if the Transaction IDs match.

In the call flow illustrated in FIG. 4, the mobile device 110 can verify that the Transaction ID included in the LPP Error Message or the LPP Abort Message matches the Transaction ID included in the Request Assistance Data message that the mobile device 110 sent to the location server 140. If the two Transaction IDs match, the mobile device 110 can be configured to accept the LPP Error Message or the LPP Abort Message received from the location server 140 as a substitute/implicit acknowledgement and to terminate the erroneous transaction. The mobile device 110 is then able to proceed with the call flow by sending subsequent uplink LPP messages as necessary.

In the example illustrated FIG. 4, the mobile device 110 can be configured to use the Transaction ID associated with the LPP Error Message or the LPP Abort Message to determine that the LPP Error Message or the LPP Abort Message is associated with and provided in response to the LPP Request Assistance Data message sent in stage 405. In other implementations, other information may be used to determine that a particular message received at the mobile device 110 is provided in response to a request sent to the location server 140 by the mobile device 110. In some implementations, the mobile device 110 can be configured to accept the next LPP Error Message or LPP Abort Message received from the location server 140 as a substitute/implicit acknowledgement or the next LPP Error Message or LPP Abort Message received from the location server 140 within a predetermined time period of the mobile device 110 sending the LPP Request Assistance Data message as a substitute/implicit acknowledgement for an explicit non-piggybacked acknowledgement.

The description of "Substitute/Implicit Acknowledgement" solution illustrated in FIGS. 3 and 4 uses mobile device-initiated LPP procedures for illustration, but the substitute/implicit acknowledgement technique can also be applied to server-initiated procedures as well. For example, the LPP Capability Transfer procedure and the LPP Location Information Transfer procedure are two examples of server-initiated procedures where the substitute/implicit acknowledgement technique can be used where the mobile device 110 supports sending of non-piggybacked acknowledgements upon received of downlink LPP messages that require acknowledgement. For the server-initiated LPP Capability Transfer procedure, the LPP Provide Capability message can be used as "Substitute/Implicit Acknowledgement" at the location server 140 where a non-piggybacked acknowledgement for the LPP Request Capability message sent by the mobile device 110 and is lost but the LPP Provide Capability message is received by the Location Server. Upon receipt of the LPP Request Capability message, the location server 140 can exit the wait-for-acknowledgement state to prevent subsequent downlink LPP signaling from being held up. For the server-initiated LPP Location Information Transfer procedure, the LPP Provide Location Information message can be used as "Substitute/Implicit Acknowledgement" at the location server 140 where the non-piggybacked acknowledgement for the LPP Request Location Information message sent by the mobile device 110 is lost but the LPP Provide Location Information message is received by the location server 140. Upon receipt of the LPP Provide Location Information message, the location server 140 can exit the wait-for-acknowledgement state to prevent subsequent downlink LPP signaling from being held up. It should be noted that, in the event that the downlink LPP message for the server-initiated procedure has problem, the mobile device 110 may send an uplink LPP Error message or an LPP Abort message, both of which can be used as substitute/Implicit acknowledgement for the non-piggybacked acknowledgement for which the location server 140 is waiting.

In general, the idea of using Substitute/Implicit Acknowledgements as described herein can be applied to any User-Initiated and Server-Initiated LPP Transfer procedure to be added to the LPP protocol in future that requires LPP acknowledgement as well as a LPP response message (assuming that the receiver chooses to do non-piggybacked acknowledgement). Overall performance improvement can be achieved at the systems level, because unnecessary retransmissions can be eliminated, latency can be reduced, and yield can be increased.

Figure 5:
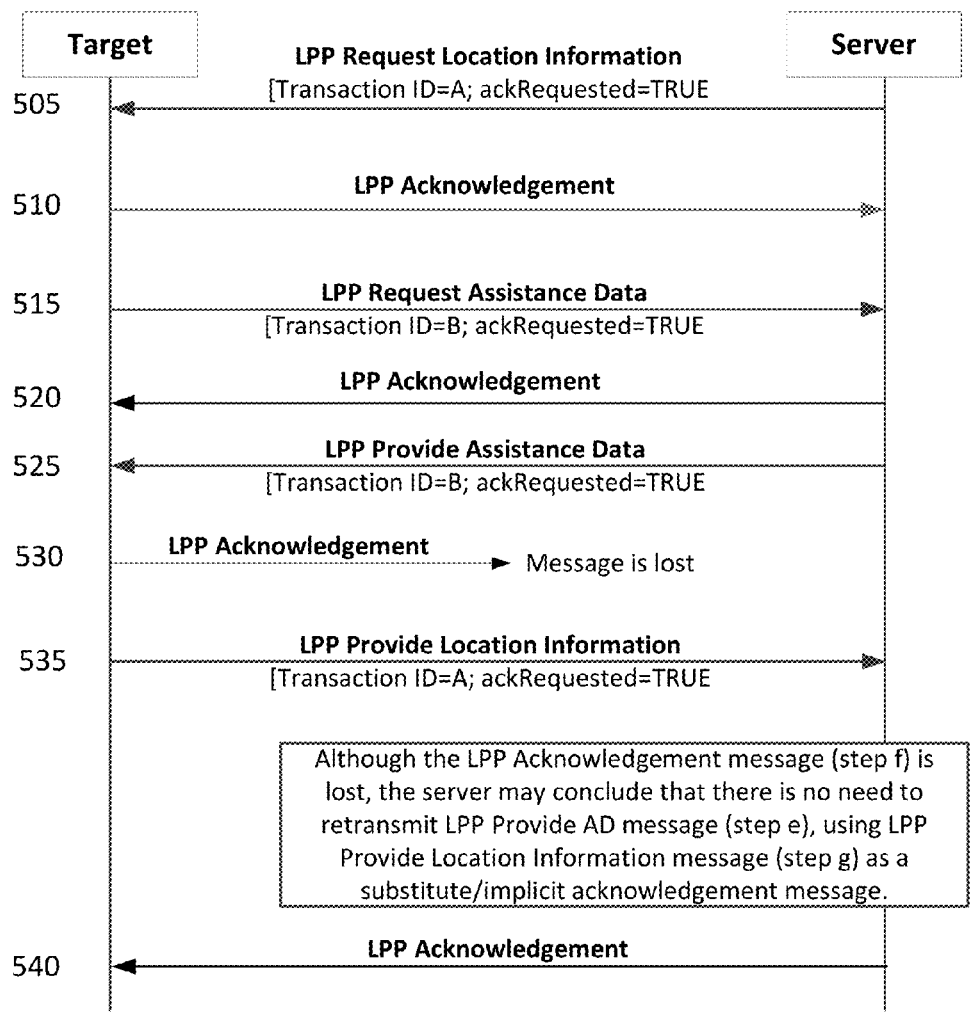
FIG. 5 is an example call flow with a provide location information message serving as a substitute/implicit acknowledgement.

FIG. 5 is call flow diagram that illustrates an example method where a communication serves as a substitute/implicit acknowledgment of a prior message. In the example illustrated in FIG. 5, the sending/receiving of the communication implies that re-sending of a prior message is moot or unnecessary, e.g., because the prior message was either received or not needed. FIG. 5 also illustrates an example of a situation where a server rather than a target device, such as a User Equipment, can accept a substitute/implicit acknowledgement instead of an express non-piggybacked acknowledgement.

At stages 505 and 510, a location information request and an acknowledgement are sent. At stage 505, a server (e.g. location server 140) sends a target device (e.g., a mobile device 110) an LPP Request Location Information message. This request includes a transaction identity (ID), here indicating a transaction ID of A. The target responds by sending an LPP acknowledgement at stage 510 that reaches the server.

At stages 515 and 520, an assistance data request and an acknowledgement are sent. At stage 515, the target sends an LPP Request Assistance Data message to the server, which responds at stage 520 *d* by sending an LPP acknowledgement that reaches the target device. The request includes an indication of a transaction ID of B.

At stages 525 and 530, an assistance data request and an acknowledgement are sent. At stage 525, the server sends the target device an LPP Provide Assistance Data request that indicates a transaction ID of B, corresponding to the request sent at stage 515. At stage 530, the target device responds to this request by sending an LPP acknowledgement that is lost or otherwise fails to reach (i.e., be received by) the server.

At stage 535, location information requested in stage 505 is provided. The target device sends an LPP Provide Location Information message to the server corresponding to the request sent at stage 505. Similar to the request sent at stage 505, the message sent at stage 535 includes a transaction ID of A. The server can thus associate the message sent by the target device and received by the server at stage 535 with the request sent by the server and received by the target device at stage 505. The server can analyze the contents of the message received at stage 535 and conclude that the message for which acknowledgement has not been received need not be re-sent. For example, the server can determine in this case that location information requested at stage 505 has been provided in the message sent at stage 535, e.g., with a desired accuracy. Thus, the server can conclude that retransmitting the assistance data message sent at stage 525 is unnecessary. The lack of need of re-sending the message may be due, e.g., to the message at stage 525 having been received and used, or to the message sent at stage 525 not having been needed to satisfy the request from stage 505. The server need not determine the cause of the mootness of re-sending the message from stage 525. In other words, the server may determine that a transaction is complete (here the request and provision of location information), and thus conclude not to retransmit a message for use in completing that transaction.

The server can provide an LPP Acknowledgement in response to the LPP Provide Location Information message (stage 540).

The example shown in FIG. 5 illustrates a situation where a server concludes that retransmission of assistance data for a location determination is moot. Substitute/Implicit Acknowledgements of other types of transactions, i.e., other than requests for and provision of location information, are possible, as are situations where the target device determines that retransmission of a message to a server or other device is not needed.

Figure 10:
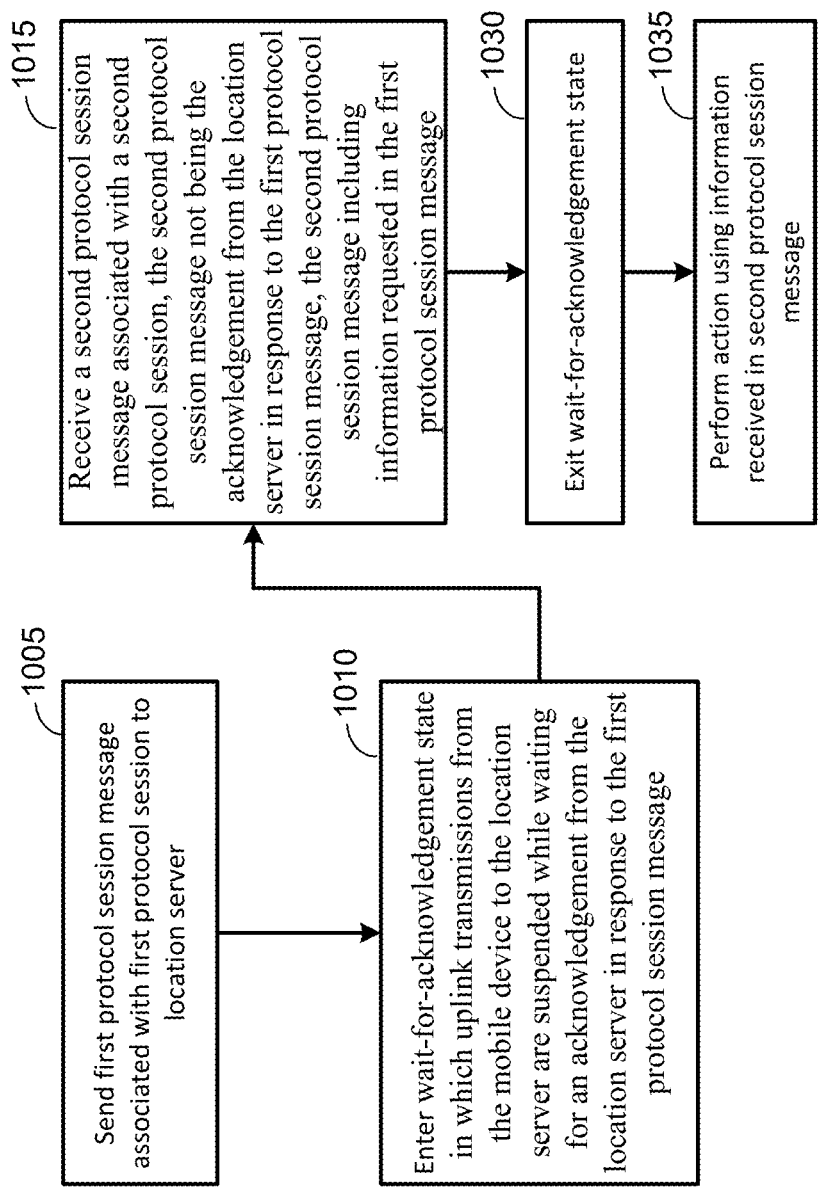
FIG. 10 is a flow diagram of a process for executing a mobile device-initiated protocol session with between a first network entity and a second network entity using a protocol with mechanisms that allow for transport over a non-reliable link.

FIG. 10 is a flow diagram of a process for executing a protocol session with between a first network entity and a second network entity using a protocol with mechanisms that allow for transport over a non-reliable link. The example provided in FIG. 10 is an example of a mobile device-initiated protocol session in which the first network entity is a mobile device 110 and the second network entity is a location server 140. In other implementations, the second network entity could be other network entities, such as the GMLC 150, the MME 130, or other network server, and the first network entity could be another device configured to communicate with another network-connected device that is configured to communicate with the first network entity using a protocol with mechanisms that allow for transport over a non-reliable link. The process illustrated in FIG. 10 can be applied to any mobile device-initiated protocol session, such as those illustrated in the preceding figures, such as FIG. 2-4. The method illustrated in FIG. 10 can be implemented by the mobile device 110.

The process can begin with a mobile device 110 sending a first protocol session message to the location server 140 (stage 1005). The first protocol session message may be part of protocol session in which the mobile device 110 and the second network entity exchange a plurality of messages. The messages exchanged between the mobile device 110 and the location server 140 may include requests for information and/or services. The message exchanges between the mobile device 110 and the location server 140 during the protocol session may also include sending requested information and/or service-related information. For example, the mobile device 110 can send a first protocol session message to the location server 140, such as in processes illustrated in FIGS. 3 and 4 where the mobile device 110 sends a LPP Request Assistance Data message to the location server 140. In the example illustrated in FIG. 5, the server can send an LPP Provide Assistance Data message to the target device. The mobile device 110 *y* can also be configured to send other types of request to the location server 140 where the mobile device 110 expects a non-piggybacked acknowledgement to the first protocol session message.

The mobile device 110 can then be configured to enter into a wait-for-acknowledgement state after sending the first protocol session message to the location server 140 (stage 1010). The mobile device 110 waits to receive the non-piggybacked acknowledgement to the first protocol session message. While the mobile device 110 is in the wait-for-acknowledgement state, subsequent uplink messages from the mobile device 110 to the location server 140 are suspended, except for acknowledgements (ACKs). For example, if the mobile device 110 receives a subsequent protocol session message from the location server 140 that requests a response from the mobile device 110, the mobile device cannot send a response to the subsequent protocol session message until the non-piggybacked acknowledgement or a substitute/implicit acknowledgement of the first protocol session message is received. Instead, the mobile device 110 can only respond to the subsequent protocol session messages with an acknowledgement (ACK). FIGS. 3 and 4 illustrate examples where the mobile device 110 waits for a non-piggybacked LPP Acknowledgement from the location server 140 in response to the LPP Request Assistance Data message sent to the location server 140 by the mobile device 110. However, the process illustrated in FIG. 10 is not limited to these specific examples, and the mobile device 110 can enter a wait-for-acknowledgement state while waiting for a non-piggybacked acknowledgement from the location server 140.

The mobile device 110 can then receive a second protocol session message from the second network entity (stage 1015). The second protocol session message is not the acknowledgement from the location server 140 in response to the first protocol session message, but the second protocol session message includes information requested in the first protocol session message. The mobile device 110 can be configured to accept the second protocol session messages as a substitute/implicit acknowledgement to the first protocol session message, since the second protocol session message includes information that was requested in the first protocol session message. The location server 140 must have received the first protocol session message and the non-piggybacked acknowledgement to the first protocol session message provided by the location server 140 in response to the first protocol session message must have been lost en route to the mobile device 110.

FIGS. 3 and 4 illustrate examples of substitute/implicit acknowledgements. In the examples illustrated in FIGS. 3 and 4, provide examples of such interactions where the mobile device 110 can enter a wait-for-acknowledgement state while waiting for an explicit LPP non-piggybacked acknowledgment from the location server 140. In the example of FIG. 3, the non-piggybacked acknowledgment from the location server 140 was lost but the mobile device 110 is configured to accept the LPP Provide Assistance Data message from the location server 140 as a substitute/implicit acknowledgement. In the example of FIG. 4, the non-piggybacked acknowledgment from the location server 140 was lost but the mobile device 110 is configured to accept the LPP Error or LPP Abort message from the location server 140 as a substitute/implicit acknowledgement.

FIG. 3 provides an example where the mobile device 110 transmits an LPP Request Assistance Data message to the location server 140. The LPP Request Assistance Data message is associated with a transaction and that transaction is assigned a transaction ID "x". The location server 140 transmits an explicit LPP Acknowledgement message to the mobile device 110 in response to receiving the LPP Request Assistance Data message from the mobile device 110, and the location server 140 subsequently transmits an LPP Provide Assistance Data message to the mobile device 110. The LPP Provide Assistance Data message is provided in response to the LPP Request Assistance Data message and is assigned the same transaction ID as the LPP Request Assistance Data message. The data provided by the LPP Provide Assistance Data is also the data that was requested in the LPP Request Assistance Data message. As a result, the mobile device 110 can use the LPP Provide Assistance Data as a substitute/implicit acknowledgement of the LPP Request Assistance Data message. Other examples of a second protocol session messages serving as a substitute/implicit response can be found in FIGS. 3 and 4. However, the process illustrated in FIG. 10 is not limited to these specific examples, and can be used in other situations where a second protocol session message can serve as a substitute/implicit acknowledgement when a non-piggybacked acknowledgement is lost.

Returning now to FIG. 10, the mobile device 110 can be configured to exit the wait-for-acknowledgement state (stage 1030). The mobile device can be configured to accept the second protocol session message as a non-piggybacked acknowledgement to the first protocol session message, and the mobile device 110 can exit the wait-for-acknowledgement state. Upon exiting the wait-for-acknowledgment state, the mobile device can be configured to proceed with the call flow of the protocol session with the location server and can be configured to perform one or more actions using information received in the second protocol session message (stage 1035). For example, after exiting in the wait-for-acknowledgement state, the mobile device 110 may be able to resume sending protocol session messages to the location server 140, if necessary.

Figure 11:
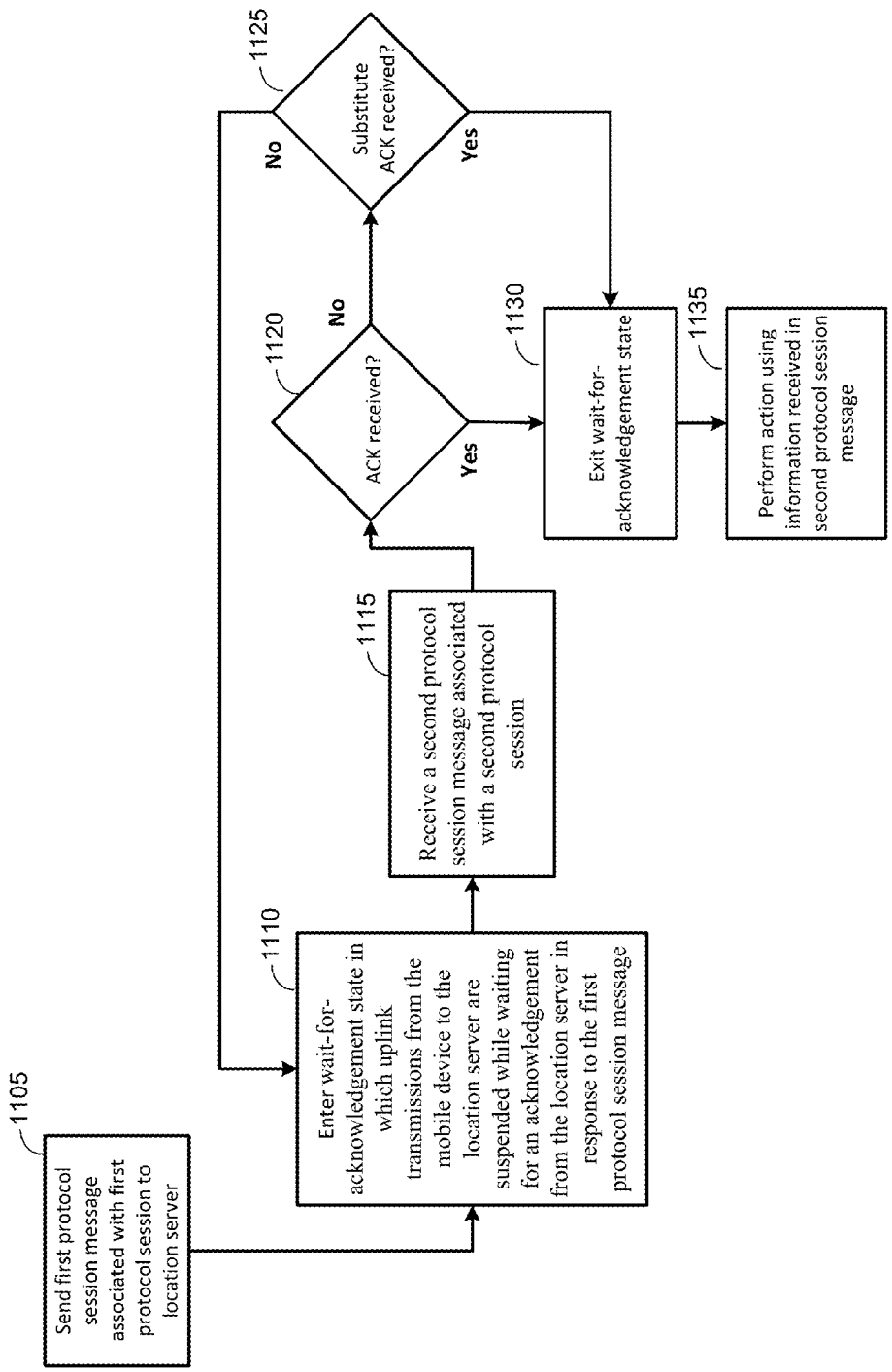
FIG. 11 is a flow diagram of a process for executing a mobile device-initiated protocol session with between a first network entity and a second network entity using a protocol with mechanisms that allow for transport over a non-reliable link.

FIG. 11 is a flow diagram of a process for executing a protocol session with between a first network entity and a second network entity using a protocol with mechanisms that allow for transport over a non-reliable link that is similar to the process described in FIG. 10 but includes a few additional stages not included in the process illustrated in FIG. 10. The example provided in FIG. 11 is an example of a mobile device-initiated protocol session in which the first network entity is a mobile device 110 and the second network entity is a location server 140. In other implementations, the second network entity could be other network entities, such as the GMLC 150, the MME 130, or other network server, and the first network entity could be another device configured to communicate with another network-connected device that is configured to communicate with the first network entity using a protocol with mechanisms that allow for transport over a non-reliable link. The process illustrated in FIG. 11 can be applied to any mobile device-initiated protocol session, such as those illustrated in the preceding figures, such as FIG. 2-4. The method illustrated in FIG. 11 can be implemented by the mobile device 110.

The process can begin with a mobile device 110 sending a first protocol session message to the location server 140 (stage 1105). The first protocol session message may be part of protocol session in which the mobile device 110 and the second network entity exchange a plurality of messages. The message exchanges between the mobile device 110 and the location server 140 may include requests for information and/or services. The message exchanges between the mobile device 110 and the location server 140 during the protocol session may also include sending requested information and/or service-related information. For example, the mobile device 110 can send a first protocol session message to the location server 140, such as in processes illustrated in FIGS. 3 and 4 where the mobile device 110 sends a LPP Request Assistance Data message to the location server 140. In the example illustrated in FIG. 5, the server can send an LPP Provide Assistance Data message to the target device. The mobile device 110y can also be configured to send other types of request to the location server 140 where the mobile device 110 expects a non-piggybacked acknowledgement to the first protocol session message.

The mobile device 110 can then be configured to enter into a wait-for-acknowledgement state after sending the first protocol session message to the location server 140 (stage 1110). The mobile device 110 waits to receive the non-piggybacked acknowledgement to the first protocol session message. While the mobile device 110 is in the wait-for-acknowledgement state, subsequent uplink messages from the mobile device 110 to the location server 140 are suspended, except for acknowledgements (ACKs). For example, if the mobile device 110 receives a subsequent protocol session message from the location server 140 that requests a response from the mobile device 110, the mobile device cannot send a response to the subsequent protocol session message until the non-piggybacked acknowledgement or a substitute/implicit acknowledgement of the first protocol session message is received. Instead, the mobile device 110 can only respond to the subsequent protocol session messages with an acknowledgement (ACK). FIGS. 3 and 4 illustrate examples where the mobile device 110 waits for a non-piggybacked LPP Acknowledgement from the location server 140 in response to the LPP Request Assistance Data message sent to the location server 140 by the mobile device 110. However, the process illustrated in FIG. 10 is not limited to these specific examples, and the mobile device 110 can enter a wait-for-acknowledgement state while waiting for a non-piggybacked acknowledgement from the location server 140.

The mobile device 110 can then receive a second protocol session message from the second network entity (stage 1115). The second protocol session message may or may not be a non-piggybacked acknowledgement from the location server 140 in response to the first protocol session message. The second protocol session message can be a non-piggybacked acknowledgement to the first protocol session message, a substitute/implicit acknowledgement, or an unrelated protocol session message. FIG. 2 illustrates an example of where an explicit LPP non-piggybacked acknowledgement is sent by a second network entity to a first network entity. FIGS. 3 and 4 illustrate examples of substitute/implicit acknowledgements. In the examples illustrated in FIGS. 3 and 4, the mobile device 110 can receive an explicit LPP non-piggybacked acknowledgment from the location server 140 or may receive an LPP Provide Assistance Data message that includes the assistance data requested by the mobile device 110 or may receive an LPP Error or LPP Abort message if there was a problem with the LPP Request Assistance Data message received by the location server 140. If the protocol session message is an unrelated protocol session message then the mobile device 110 can be configured to remain in the wait-for-acknowledgement state.

The mobile device 110 can then make a determination whether the second protocol session message is a non-piggybacked acknowledgement to the first protocol session message (stage 1120). If the second protocol session message is not a non-piggybacked acknowledgement to the first protocol session message, the mobile device 110 can be configured to make a determination whether the second protocol session message is a substitute/implicit acknowledgement of the first protocol session message (stage 1125). The substitute/implicit acknowledgement can comprise a second protocol session message associated with a transaction associated with the first protocol session message and the second protocol session message may contain information requested in the first protocol session message. If the second protocol session message is a substitute/implicit acknowledgement of the first protocol session message to the first protocol session message, the mobile device 110 can be configured to exit the wait-for-acknowledgement state (stage 1130).

FIG. 3 provides an example where the mobile device 110 transmits an LPP Request Assistance Data message to the location server 140. The LPP Request Assistance Data message is associated with a transaction and that transaction is assigned a transaction ID "x". The location server 140 transmits an explicit LPP Acknowledgement message to the mobile device 110 in response to receiving the LPP Request Assistance Data message from the mobile device 110, and the location server 140 subsequently transmits an LPP Provide Assistance Data message to the mobile device 110. The LPP Provide Assistance Data message is provided in response to the LPP Request Assistance Data message and is assigned the same transaction ID as the LPP Request Assistance Data message. The data provided by the LPP Provide Assistance Data is also the data that was requested in the LPP Request Assistance Data message. As a result, the mobile device 110 can use the LPP Provide Assistance Data as a substitute/implicit acknowledgement of the LPP Request Assistance Data message. Other examples of a second protocol session messages serving as a substitute/implicit response can be found in FIGS. 3 and 4. However, the process illustrated in FIG. 11 is not limited to these specific examples, and can be used in other situations where a second protocol session message can serve as a substitute/implicit acknowledgement when a non-piggybacked acknowledgement is lost.

Returning now to FIG. 11, if the second protocol session message is a non-piggybacked acknowledgement to the first protocol session message, the mobile device 110 can be configured to exit the wait-for-acknowledgement state (stage 1130). Upon exiting the wait-for-acknowledgment state, the mobile device can be configured to proceed with the call flow of the protocol session with the location server and can be configured to perform one or more actions using information received in the second protocol session message (stage 1135). For example, after exiting in the wait-for-acknowledgement state, the mobile device 110 may be able to resume sending protocol session messages to the location server 140, if necessary.

Figure 9:
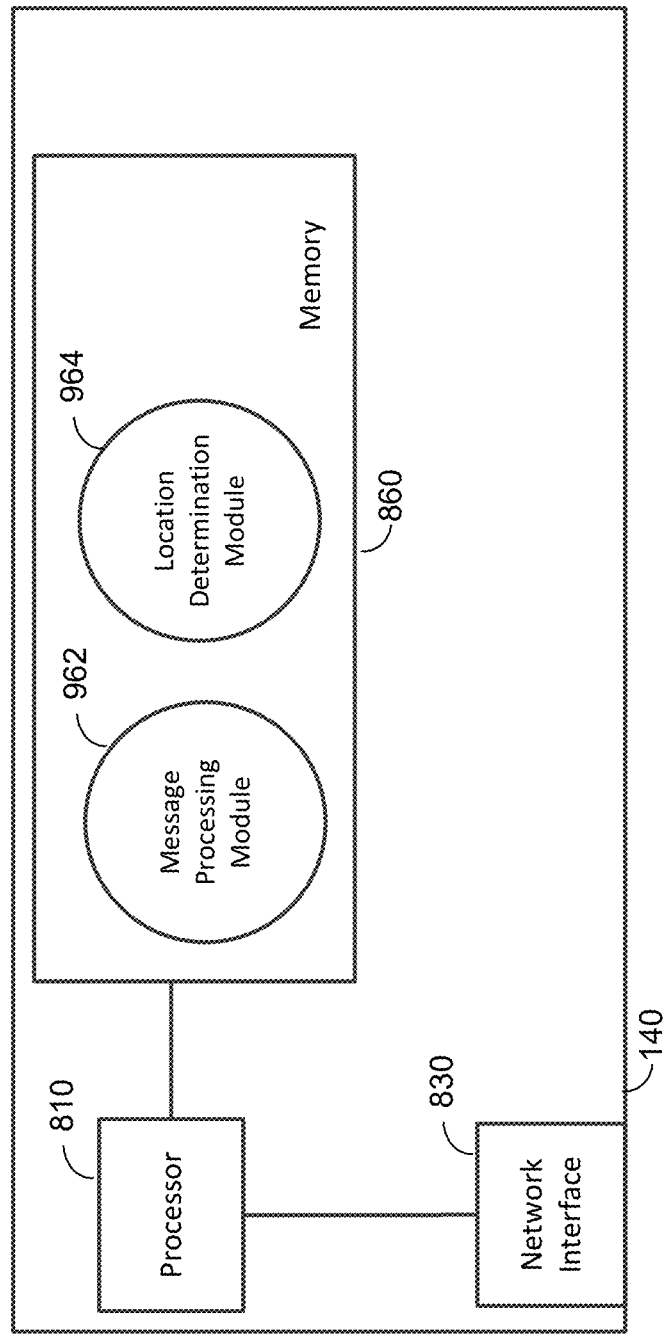
FIG. 9 is a functional block diagram of the location server illustrated in the preceding figures that illustrates functional modules of a memory shown in FIG. 8.
Figure 12:
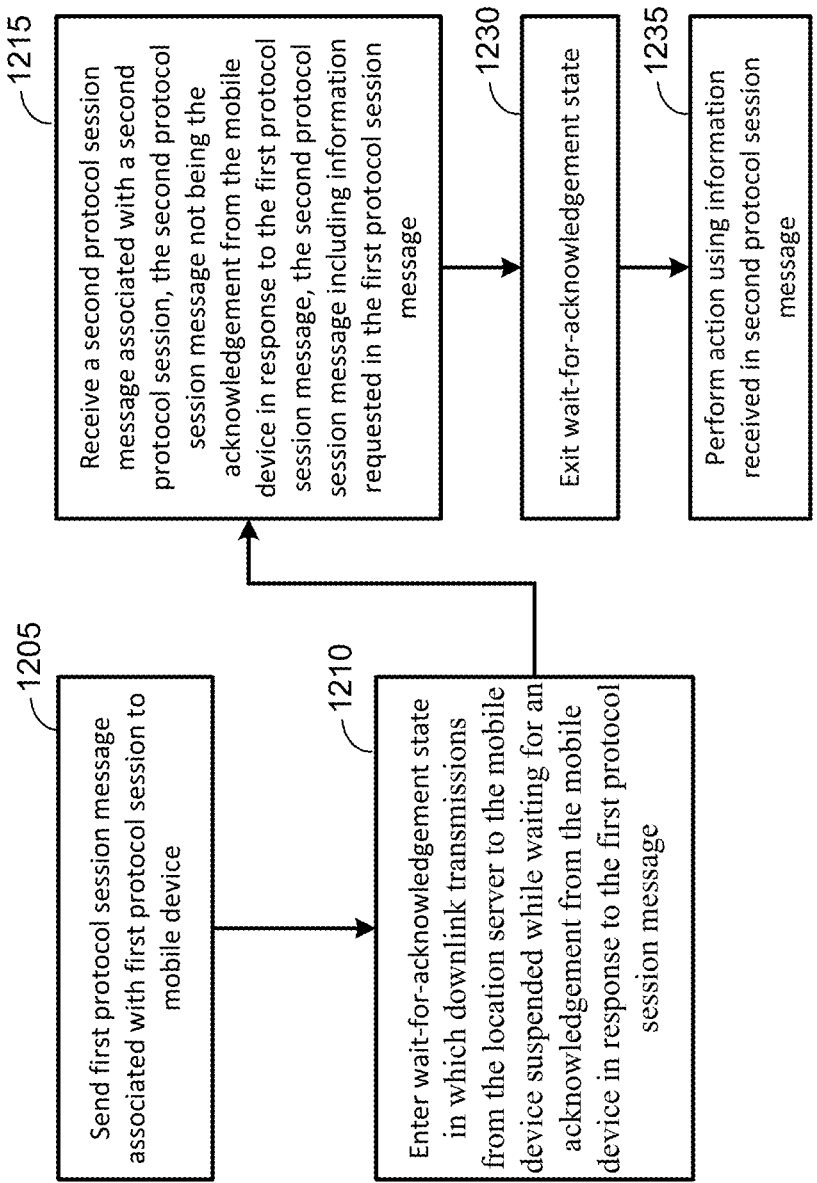
FIG. 12 is a flow diagram of a process for executing a server-initiated protocol session with between a first network entity and a second network entity using a protocol with mechanisms that allow for transport over a non-reliable link.

FIG. 12 is another flow diagram of an example process for executing a protocol session with between a first network entity and a second network entity using a protocol with mechanisms that allow for transport over a non-reliable link that is similar to that illustrated in FIGS. 9 and 10. The example provided in FIG. 12 is an example of a server-initiated protocol session in which the first network entity is a location server 140 and the second network entity is a mobile device 110. In other implementations, the first network entity could be other network entities, such as the GMLC 150, the MME 130, or other network server, and the second network entity could be another device configured to communicate with another network-connected device that is configured to communicate with the first network entity using a protocol with mechanisms that allow for transport over a non-reliable link. The process illustrated in FIG. 12 can be applied to any server-initiated protocol session, such as those illustrated in the preceding figures, as FIG. 5. The method illustrated in FIG. 12 can be implemented by the location server 140.

The process can begin with sending from the from the location server 140 a first protocol session message associated with a first protocol session to the mobile device (stage 1205). The first protocol session message may be part of protocol session in which the location server 140 and the mobile device 110 exchange a plurality of messages. The message exchanges between the location server 140 and the mobile device 110 may include requests for information and/or services. The message exchanges between the location server 140 and the mobile device 110 during the protocol session may also include sending requested information and/or service-related information. Referring to the example illustrated in FIG. 5, the location server 140 can send an LPP Provide Assistance Data message to a target device, which in this example is the mobile device 110. The location server 140 can also be configured to send other types of requests to the mobile device 110 in response to which the location server 140 expects a non-piggybacked acknowledgement to the first protocol session message from the mobile device 110.

The location server 140 can then be configured to enter into a wait-for-acknowledgement state after sending the first protocol session message to the mobile device 110 (stage 1210). The location server 140 waits to receive the non-piggybacked acknowledgement to the first protocol session message from the mobile device 110. While the location server 140 is in the wait-for-acknowledgement state, subsequent downlink messages from the location server 140 to the mobile device 110 are suspended, except for acknowledgements (ACKs). For example, if the location server 140 receives a subsequent protocol session message from the mobile device 110 that requests a response from location server 140, the location server 140 cannot send response to the subsequent protocol session message until the non-piggybacked acknowledgement or a substitute/implicit acknowledgement of the first protocol session message is received. Instead, the location server 140 can only respond to the subsequent protocol session messages with an acknowledgement (ACK). FIG. 5 illustrates an example where the location server 140 waits for an acknowledgment from the mobile device 110 in response to an LPP Provide Assistance Data message. However, the process illustrated in FIG. 12 is not limited to this specific example, and the location server 140 can enter a wait-for-acknowledgement state while waiting for a non-piggybacked acknowledgement from the mobile device 110 in response to other types of requests from the location server 140.

The location server 140 can then receive a second protocol session message from the mobile device 110 (stage 1215). The second protocol session message is not the acknowledgement from the mobile device 110 in response to the first protocol session message, but the second protocol session message includes information requested in the first protocol session message. The location server 140 can be configured to accept the second protocol session messages as a substitute/implicit acknowledgement to the first protocol session message, since the second protocol session message includes information that was requested in the first protocol session message. The mobile device 110 must have received the first protocol session message and the non-piggybacked acknowledgement to the first protocol session message provided by the mobile device 110 in response to the first protocol session message must have been lost. FIG. 5 provides an example of such an interaction where the location server 140 can enter a wait-for-acknowledgement state while waiting for an explicit LPP non-piggybacked acknowledgment from the mobile device 110 in response to sending an LPP Provide Assistance Data message to the target device. The non-piggybacked acknowledgment from the mobile device 110 was lost but the location server 140 accepts the LPP Provide Location Information message from the mobile device 110 as a substitute/implicit acknowledgement.

The location server 140 can be configured to exit the wait-for-acknowledgement state (stage 1230). The second protocol session message accepted as a non-piggybacked acknowledgement to the first protocol session message, and the location server 140 can exit the wait-for-acknowledgement state. Upon exiting the wait-for-acknowledgment state, the location server 140 can be configured to proceed with the call flow of the protocol session with the mobile device 110 and can be configured to perform one or more actions using information received in the second protocol session message (stage 1235). For example, the location server 140 may resume sending protocol session messages to the mobile device 110, if necessary. In one example, the location of a mobile device 110 may have been determined during the protocol session and the location information may then be used to provide location-based services to a user of the mobile device 110 or to another network entity, such as a mapping or navigation application on another mobile device or to provide location-related information to the mobile device 110. Other types of actions may also be provided by the location server 140 based on the types of information included in the second protocol session message.

The process illustrated in FIG. 12 is not limited to the specific examples provided above, and can be used in other situations where a second protocol session message can serve as a substitute/implicit acknowledgement when a non-piggybacked acknowledgement is lost.

Figure 13:
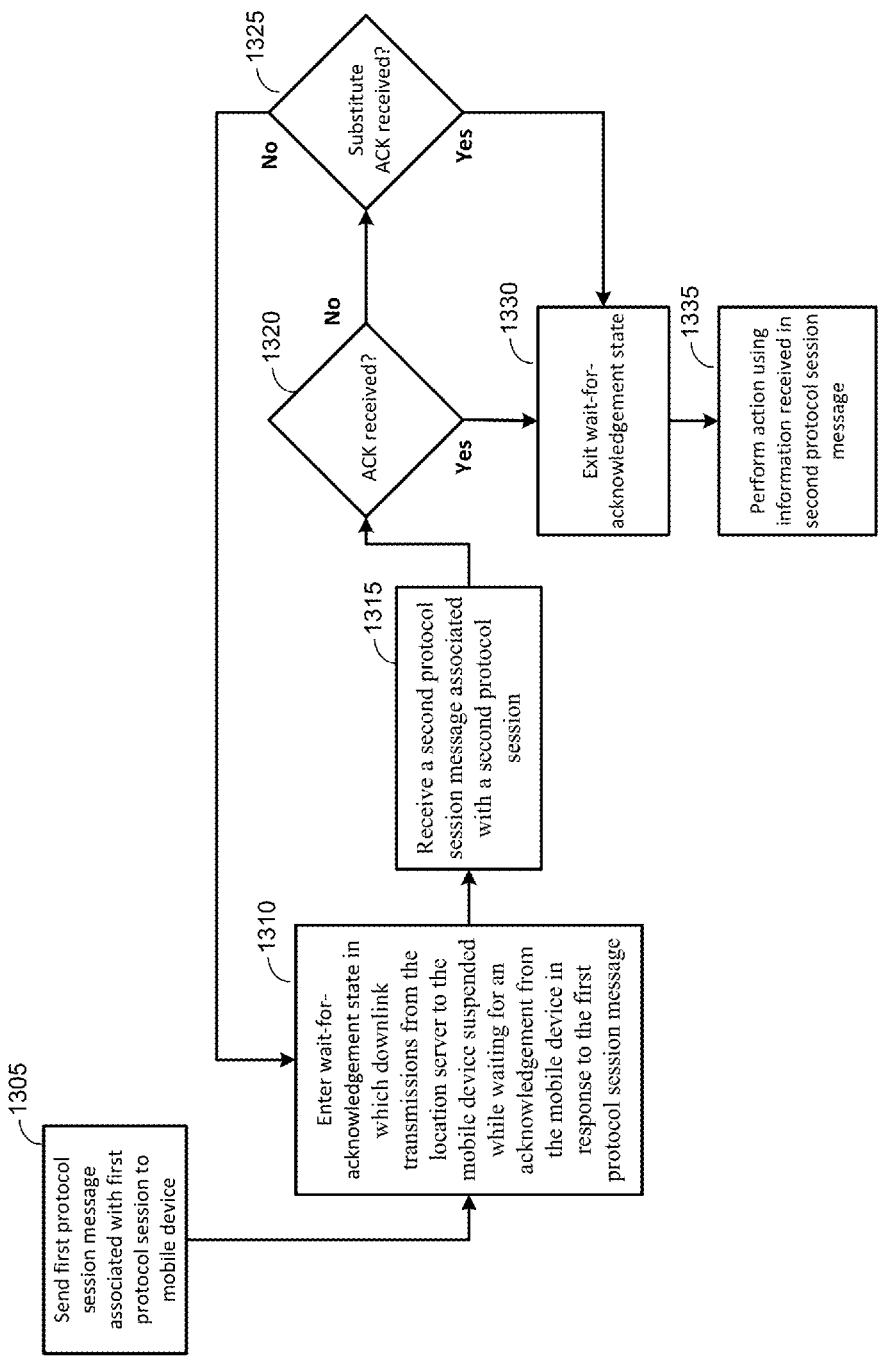
FIG. 13 is a flow diagram of a process for executing a server-initiated protocol session with between a first network entity and a second network entity using a protocol with mechanisms that allow for transport over a non-reliable link.

FIG. 13 is another flow diagram of an example process for executing a protocol session with between a first network entity and a second network entity using a protocol with mechanisms that allow for transport over a non-reliable link that is similar to that illustrated in the process illustrated in FIG. 12, but includes additional stages not included in the process illustrated FIG. 12. The example provided in FIG. 13 is an example of a server-initiated protocol session in which the first network entity is a location server 140 and the second network entity is a mobile device 110. In other implementations, the first network entity could be other network entities, such as the GMLC 150, the MME 130, or other network server, and the second network entity could be another device configured to communicate with another network-connected device that is configured to communicate with the first network entity using a protocol with mechanisms that allow for transport over a non-reliable link. The process illustrated in FIG. 13 can be applied to any server-initiated protocol session, such as those illustrated in the preceding figures, such as FIG. 5. The process illustrated in FIG. 13 can be implemented by the location server 140.

The process can begin with sending from the from the location server 140 a first protocol session message associated with a first protocol session to the mobile device (stage 1305). Stage 1305 is similar to that of stage 1205 of the process illustrated in FIG. 12.

The location server 140 can then be configured to enter into a wait-for-acknowledgement state after sending the first protocol session message to the mobile device 110 (stage 1310). Stage 1310 is similar to that of stage 1310 of the process illustrated in FIG. 12.

The location server 140 can then receive a second protocol session message from the mobile device 110 (stage 1315). The second protocol session message may or may not be a non-piggybacked acknowledgement from the mobile device 110 in response to the first protocol session message. The second protocol session message can be a non-piggybacked acknowledgement to the first protocol session message, a substitute/implicit acknowledgement, or an unrelated protocol session message. In the example illustrated in FIG. 5, the location server 140 can enter a wait-for-acknowledgement state while waiting for an explicit LPP non-piggybacked acknowledgment from the mobile device 110 in response to sending an LPP Provide Assistance Data message to the target device. The location server 140 can be configured accept an explicit LPP Acknowledgement from the mobile device 110 or an LPP Provide Location Information message from the mobile device 110 to trigger the location server 140 to exit the wait-for-acknowledgement state. If the protocol session message is an unrelated protocol session message then the location server 140 can be configured to remain in the wait-for-acknowledgement state.

The location server 140 can then make a determination whether the second protocol session message is a non-piggybacked acknowledgement to the first protocol session message (stage 1320). If the second protocol session message is not a non-piggybacked acknowledgement to the first protocol session message, the location server 140 can be configured to make a determination whether the second protocol session message is a substitute/implicit acknowledgement of the first protocol session message (stage 1325). The substitute/implicit acknowledgement can comprise a second protocol session message associated with a transaction associated with the first protocol session message and the second protocol session message may contain information requested in the first protocol session message. If the second protocol session message is a substitute/implicit acknowledgement of the first protocol session message to the first protocol session message, the location server 140 can be configured to exit the wait-for-acknowledgement state (stage 1330).

Returning now to FIG. 13, if the second protocol session message is a non-piggybacked acknowledgement to the first protocol session message, the location server 140 can be configured to exit the wait-for-acknowledgement state (stage 1330). Upon exiting the wait-for-acknowledgment state, the location server 140 can be configured to proceed with the call flow of the protocol session with the mobile device 110 and can be configured to perform one or more actions using information received in the second protocol session message (stage 1335). For example, the location server 140 may resume sending protocol session messages to the mobile device 110, if necessary. In one example, the location of a mobile device 110 may have been determined during the protocol session and the location information may then be used to provide location-based services to a user of the mobile device 110 or to another network entity, such as a mapping or navigation application on another mobile device or to provide location-related information to the mobile device 110. Other types of actions may also be provided by the location server 140 based on the types of information included in the second protocol session message.

Example Hardware

Figure 6:
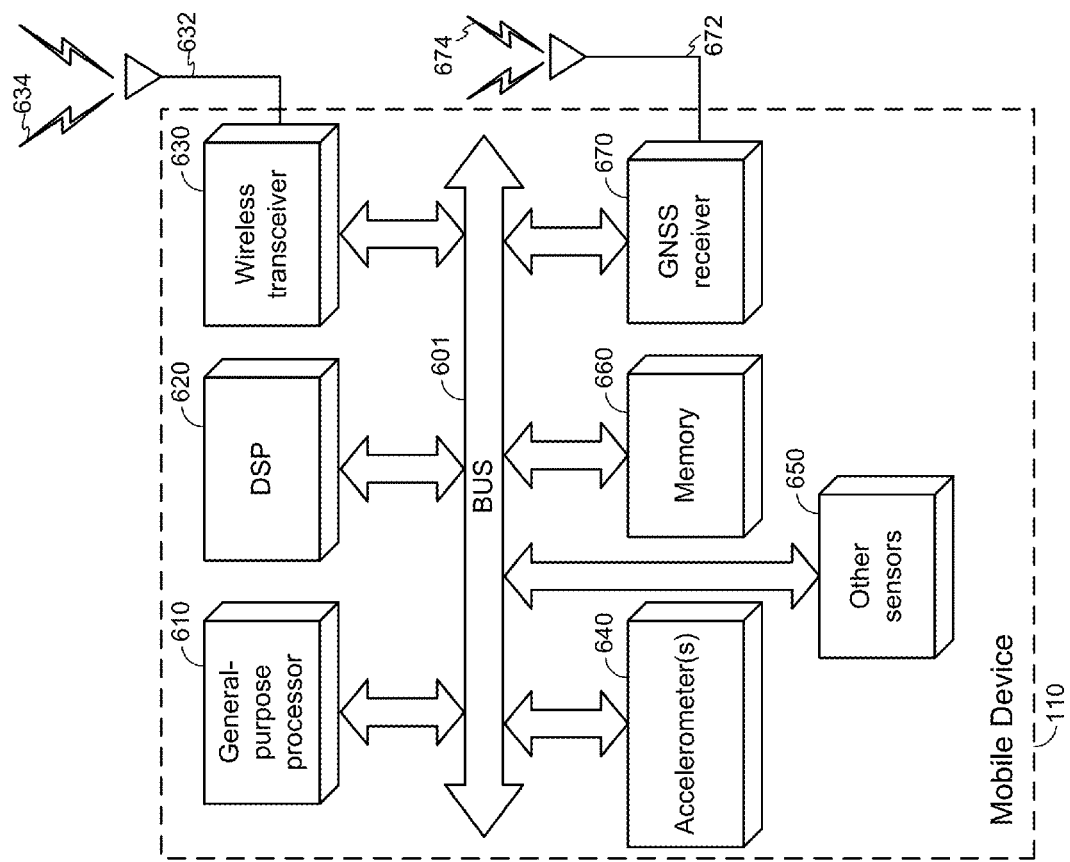
FIG. 6 is a block diagram of a mobile device that can be used to implement the mobile device described in the preceding figures.

FIG. 6 is a block diagram of a mobile device that can be used to implement the User Equipment 110 illustrated in the preceding figures. The mobile device 110 comprises a computer system including a general-purpose processor 610, a digital signal processor (DSP) 620, a wireless transceiver 630, and a non-transitory memory 660, connected to each other by a bus 601. The mobile device 110 can also include one or more of the following features: one or more accelerometers 640, other sensors 650, and a GNSS receiver 670. The wireless transceiver 630 is connected by a line 632 to an antenna 634 for sending and receiving communications to/from the base stations 120 (eNB) shown in FIG. 1. The mobile device 110 may include a GNSS receiver 670 in examples where absolute positioning is used in conjunction with the relative positioning techniques described above.

The GNSS receiver 670 is connected by a line 672 to an antenna 674 for receiving location signals (signals from which, at least in part, location of mobile device 110 can be determined) from satellites of one or more GNSS systems. The processor 610 can be an intelligent device, e.g., a personal computer central processing unit (CPU) such as those made by Intel® Corporation or AMD®, a microcontroller, an application specific integrated circuit (ASIC), etc. The memory 660 is a storage device that includes random access memory (RAM) and read-only memory (ROM). The memory 660 stores processor-readable, processor-executable software code containing instructions for controlling the processor 610 to perform functions described herein (although the description may read that the software performs the function(s)). The software can be loaded onto the memory 660 by being downloaded via a network connection, uploaded from a disk, etc. Further, the software may not be directly executable, e.g., requiring compiling before execution.

The mobile device 110 may include one or more other sensors 650 that are configured to measure various data that can be used to supplement the relative positioning information collected by the mobile device 110. For example, the other sensors 650 may include a magnetometer and/or a gyroscope and/or still other sensors. The accelerometer(s) 640 and/or one or more of the other sensors 650 is/are configured to provide information regarding the orientation of the mobile device 110.

The software in the memory 660 is configured to enable the processor 610 to perform various actions, including implementing the various position location related techniques described herein.

Figure 7:
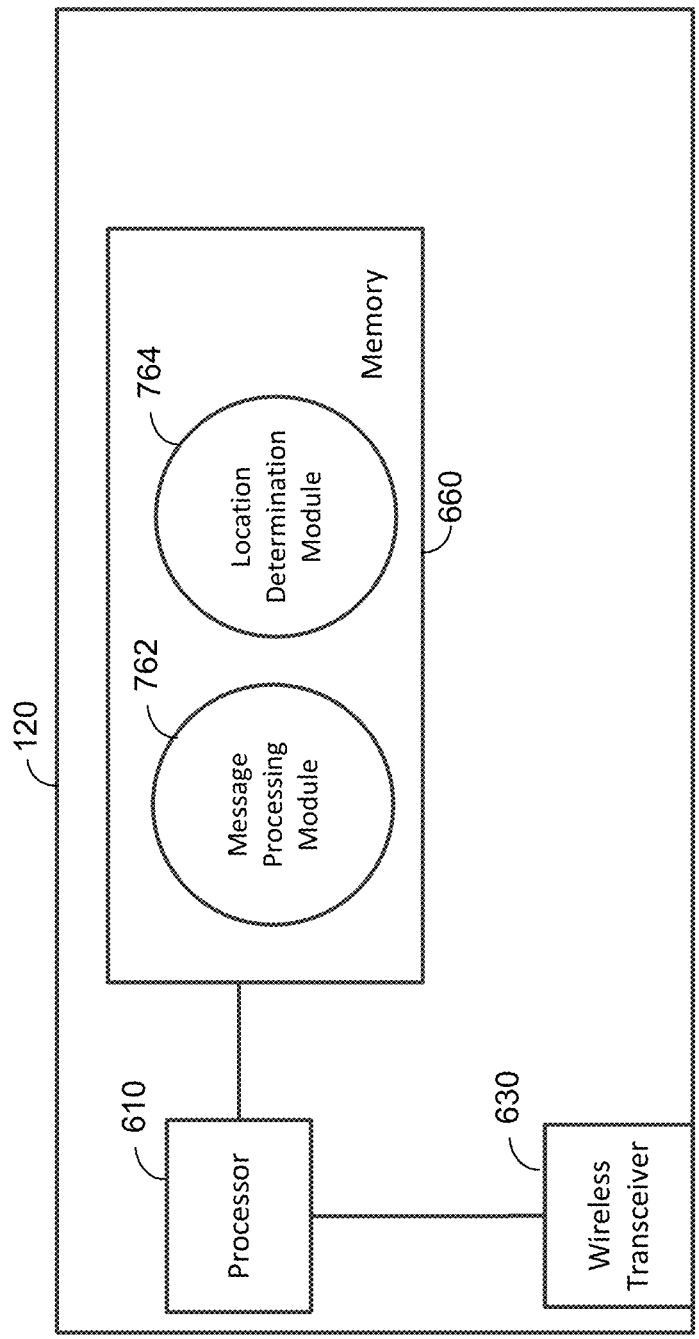
FIG. 7 is a functional block diagram of the mobile device illustrated in the preceding figures that illustrates functional modules of a memory shown in FIG. 6.

FIG. 7 is a functional block diagram of the mobile device 110 illustrated in FIG. 6 that illustrates functional modules of a memory shown in FIG. 6. For example, the mobile device 110 can include a message processing module 762 and a location determination module 764. The mobile device 110 may also include one or more additional functional modules that provide other functionality to the mobile device 110. The mobile device 110 illustrated in FIGS. 6 and 7 can be used to implement the mobile devices associated with the processes illustrated in FIGS. 2-5, and 10-13.

The message processing module 762 can be configured to generate messages to be transmitted to the location server 140 and/or other devices and to receive and process messages received from the location server 140 and/or other devices. For example, the message processing module 762 can be configured to transmit and/or receive LPP messages, such as those described in the preceding figures. The message processing module 762 can also be configured to determine whether a message requires an acknowledgement and can be configured to place the mobile device 110 into a wait-for-acknowledgement state while waiting for an acknowledgement. The message processing module 762 can also be configured to determine whether an acknowledgement has been received in response to a message requiring an acknowledgement or whether a substitute/implicit acknowledgement has been received and to remove the mobile device 110 from the wait-for-acknowledgement state if the an acknowledgement or whether a substitute/implicit acknowledgement has been received.

The location determination module 764 can be configured to determine the location of the mobile device 110 and/or to request assistance data from the location server 140 that the mobile device 110 can use to determine the location of the mobile device 110. The location determination module 764 can be configured to use signal information received from a Global Positioning System (GPS) or other Global Navigation Satellite System (GNSS), or by using trilateration or triangulation techniques to determine the location of the mobile device 110. The location determination module 764 can also be configured to receive assistance data from the location server 140 that the mobile device 110 can use to acquire signals from satellite vehicles (SVs) that are part of the GPS system and/or other SNSS system that can be used by the mobile device 110 to determine the location of the mobile device 110 or be sent to the location server 140 to allow the location server 140 determine the location of the mobile device 110. For example, the location determination module 764 can be configured to perform trilateration using signal measurements (e.g., RSSI (received signal strength indication), RTT (round-trip time)), time of arrival (TOA), measurements received from the mobile device 110 based on the known positions of the wireless access points and/or eNodeBs from which the signal measurements are obtained.

Figure 8:
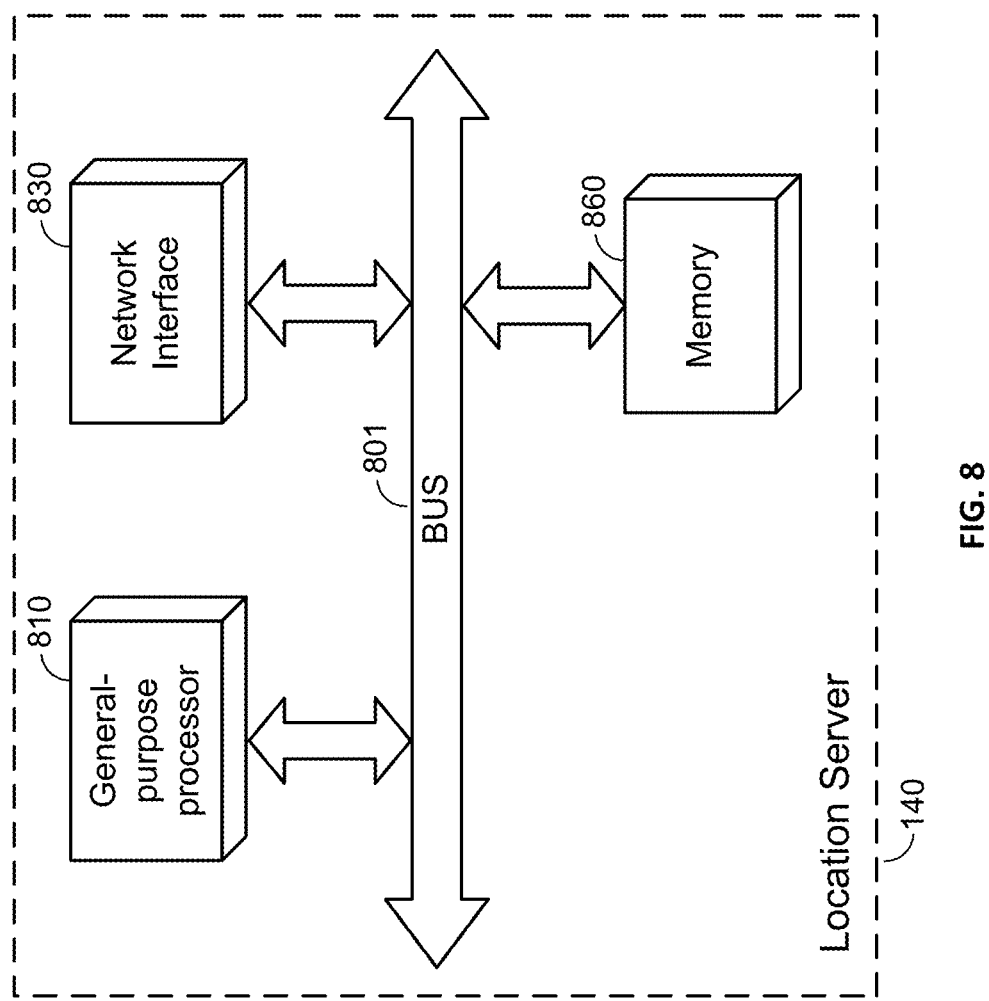
FIG. 8 is a block diagram of a server that can be used to implement the server described in the preceding figures.

FIG. 8 is a block diagram of an example server that can be used to implement the location server 140 illustrated in the preceding figures. For example, the example server illustrated in FIG. 8 can be used to implement an E-SMLC. However, the server illustrated in FIG. 8 can also be used to implement the GMLC 150 and the MME 130 illustrated in FIG. 1.

The location server 140 comprises a computer system including a general-purpose processor 810, a network interface 830, and a non-transitory memory 860, connected to each other by a bus 801.

The processor 810 can be an intelligent device, e.g., a personal computer central processing unit (CPU) such as those made by Intel® Corporation or AMD®, a microcontroller, an application specific integrated circuit (ASIC), etc. The processor 810 can be configured to execute computer processor-readable, processor-executable software code stored in the memory 860.

The memory 860 is a storage device that includes random access memory (RAM) and/or read-only memory (ROM). The memory 860 stores processor-readable, processor-executable software code containing instructions for controlling the processor 810 to perform functions described herein (although the description may read that the software performs the function(s)). The software can be loaded onto the memory 860 by being downloaded via a network connection, uploaded from a disk, etc. Further, the software may not be directly executable, e.g., requiring compiling before execution. The software in the memory 860 is configured to enable the processor 810 to perform various actions, including implementing the various position location related techniques described herein. The location server 140 can also include one or more external memory devices (not shown) that can be used to store data and/or processor-executable program code.

The network interface 830 can be configured to provide bidirectional wireless and/or wired network communications to other components of the LTE network, such as those illustrated in FIG. 1, as well as other network elements outside of the LTE network. The bidirectional wireless and/or wired network communications may be routed over one or more wired and/or wireless networks, such as the Internet, a wireless network service provider's core network, one or more wireless local area networks (WLANs), and/or other types of network. The network communications may also pass through one or more intermediate network entities. For example, communications between the location server 140 and a mobile device 110 may be routed through an MME 130 and a base station 120.

FIG. 9 is a functional block diagram of a location server 140 illustrated in FIG. 8 that illustrates functional modules of the memory illustrated in FIG. 8. FIG. 9 illustrates functional modules in a memory 860 as well as some of the physical components of the location server 140. The memory 860 can include one more functional modules that provide functionality to the location server 140. In the example illustrated in FIG. 9, the location server 140 includes a message processing module 862 and a location determination module 864. The location server 140 may include additional components and/or modules that provide additional functionality to the location server 140. The location server illustrated in FIGS. 8 and 9 can be used to implement the servers associated with the processes illustrated in FIGS. 2-5, and 10-13.

The message processing module 962 can be configured to generate messages to be transmitted from the location server 140 to other devices on the LTE network, such as the MME 130, mobile device 110, or other networked device, and to receive and process messages received from the MME 130, mobile device 110, and/or other networked devices. For example, the message processing module 962 can be configured to transmit and/or receive LPP messages, such as those described in the preceding figures. The message processing module 962 can also be configured to determine whether a message requires an acknowledgement and can be configured to place the mobile device 110 into a wait-for-acknowledgement state while waiting for an acknowledgement. The message processing module 962 can also be configured to determine whether an acknowledgement has been received in response to a message requiring an acknowledgement or whether a substitute/implicit acknowledgement has been received and to remove the mobile device 110 from the wait-for-acknowledgement state if the an acknowledgement or whether a substitute/implicit acknowledgement has been received.

The location determination module 964 can be configured to determine the location of the mobile device 110 and/or to provide assistance data to the mobile device 110 that the mobile device 110 can use to determine the location of the mobile device 110. The location determination module 964 can be configured to use signal information received from a Global Positioning System (GPS) or other Global Navigation Satellite System (GNSS), or by using trilateration or triangulation techniques to determine the location of the mobile device 110. This signal information can be collected by the mobile device 110 and provided to the location server 140 by the mobile device 110. The location determination module 964 can also be configured to provide assistance data to the mobile device 110 that the mobile device 110 can use to acquire signals from satellite vehicles (SVs) that are part of the GPS system and/or other SNSS system that can be used by the mobile device 110 to determine the location of the mobile device 110 or be sent to the location server 140 to allow the location server 140 determine the location of the mobile device 110. For example, the location determination module 964 can be configured to perform trilateration using signal measurements (e.g., RSSI (received signal strength indication), RTT (round-trip time)), time of arrival (TOA), measurements received from the mobile device 110 based on the known positions of the wireless access points and/or eNodeBs from which the signal measurements are obtained.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media. Tangible media include one or more physical articles of machine readable media, such as random access memory, magnetic storage, optical storage media, and so on.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Such media also provide examples of non-transitory media, which can be machine readable, and wherein computers are an example of a machine that can read from such non-transitory media.

The generic principles discussed herein may be applied to other implementations without departing from the spirit or scope of the disclosure or claims.

What is claimed is:

1. A method for executing on a location server a protocol session with a mobile device using a protocol with mechanisms that allow for transport of protocol messages over a non-reliable link, the method comprising:
    sending a first protocol session message associated with a first protocol session to the mobile device;
    entering a wait-for-acknowledgement state in which downlink transmissions from the location server to the mobile device are suspended while waiting for an acknowledgement from the mobile device in response to the first protocol session message;
    receiving a second protocol session message associated with a second protocol session, the second protocol session message not being the acknowledgement from the mobile device in response to the first protocol session message, the second protocol session message including information requested in the first protocol session message;
    exiting the wait-for-acknowledgement state responsive to receiving the second protocol session message; and
    performing an action using the information received in the second protocol session message.

2. The method of claim 1 wherein the first protocol session message comprises a request for information from the mobile device and the second protocol session message includes the information from the mobile device.

3. The method of claim 1, further comprising:
    resending the first protocol session message to the mobile device if neither the acknowledgement from the mobile device in response to the first protocol session message nor the second protocol session message is received by the mobile device prior to expiration of a retransmission timer.

4. The method of claim 1, further comprising:
    comparing a first transaction ID associated with the first protocol session message to a second transaction ID associated with the second protocol session message, and
    exiting the wait-for-acknowledgement state responsive to receiving the second protocol session message only if the first transaction ID matches the second transaction ID.

5. The method of claim 1 wherein the first protocol session message is an LTE Positioning Protocol (LPP) Provide Assistance Data message and the second protocol session message is an LPP Provide Location Information message.

6. An apparatus for executing on a location server a protocol session with a mobile device using a protocol with mechanisms that allow for transport of protocol messages over a non-reliable link, the apparatus comprising:
    means for sending a first protocol session message associated with a first protocol session to the mobile device;
    means for entering a wait-for-acknowledgement state in which downlink transmissions from the location server to the mobile device are suspended while waiting for an acknowledgement from the mobile device in response to the first protocol session message;
    means for receiving a second protocol session message associated with a second protocol session, the second protocol session message not being the acknowledgement from the mobile device in response to the first protocol session message, the second protocol session message including information requested in the first protocol session message;
    means for exiting the wait-for-acknowledgement state responsive to receiving the second protocol session message; and
    means for performing an action using the information received in the second protocol session message.

7. The apparatus of claim 6 wherein the first protocol session message comprises a request for information from the mobile device and the second protocol session message includes the information from the mobile device.

8. The apparatus of claim 6, further comprising:
    means for resending the first protocol session message to the mobile device if neither the acknowledgement from the mobile device in response to the first protocol session message nor the second protocol session message is received by the mobile device prior to expiration of a retransmission timer.

9. The apparatus of claim 6, further comprising means for comparing a first transaction ID associated with the first protocol session message to a second transaction ID associated with the second protocol session message, and wherein the means for exiting the wait-for-acknowledgement state responsive to receiving the second protocol session message operates only if the first transaction ID matches the second transaction ID.

10. The apparatus of claim 6 wherein the first protocol session message is an LTE Positioning Protocol (LPP) Provide Assistance Data message and the second protocol session message is an LPP Provide Location Information message.

11. An apparatus for executing on a location server a protocol session with a mobile device using a protocol with mechanisms that allow for transport of protocol messages over a non-reliable link, the apparatus comprising:
   a network interface configured to transmit and receive data via one or more networks;
   a memory configured to store processor-executable program code;
   a processor configured to:
      send a first protocol session message associated with a first protocol session to the mobile device;
      enter a wait-for-acknowledgement state in which downlink transmissions from the location server to the mobile device are suspended while waiting for an acknowledgement from the mobile device in response to the first protocol session message;
      receive a second protocol session message associated with a second protocol session, the second protocol session message not being the acknowledgement from the mobile device in response to the first protocol session message, the second protocol session message including information requested in the first protocol session message;
      exit the wait-for-acknowledgement state responsive to receiving the second protocol session message; and
      perform an action using the information received in the second protocol session message.

12. The apparatus of claim 11 wherein the first protocol session message comprises a request for information from the mobile device and the second protocol session message includes the information from the mobile device.

13. The apparatus of claim 11 wherein the processor is further configured to:
   resend the first protocol session message to the mobile device if neither the acknowledgement from the mobile device in response to the first protocol session message nor the second protocol session message is received by the mobile device prior to expiration of a retransmission timer.

14. The apparatus of claim 11 wherein the processor is further configured to:
   compare a first transaction ID associated with the first protocol session message to a second transaction ID associated with the second protocol session message, and
   exit the wait-for-acknowledgement state responsive to receiving the second protocol session message only if the first transaction ID matches the second transaction ID.

15. The apparatus of claim 11 wherein the first protocol session message is an LTE Positioning Protocol (LPP) Provide Assistance Data message and the second protocol session message is an LPP Provide Location Information message.

16. A non-transitory computer-readable medium, having stored thereon computer-readable instructions for executing on a location server a protocol session with a mobile device using a protocol with mechanisms that allow for transport of protocol messages over a non-reliable link, comprising instructions configured to cause a computer to:
   send a first protocol session message associated with a first protocol session to the mobile device;
   enter a wait-for-acknowledgement state in which downlink transmissions from the location server to the mobile device are suspended while waiting for an acknowledgement from the mobile device in response to the first protocol session message;
   receive a second protocol session message associated with a second protocol session, the second protocol session message not being the acknowledgement from the mobile device in response to the first protocol session message, the second protocol session message including information requested in the first protocol session message;
   exit the wait-for-acknowledgement state responsive to receiving the second protocol session message; and
   perform an action using the information received in the second protocol session message.

17. The non-transitory computer-readable medium of claim 16 wherein the first protocol session message comprises a request for information from the mobile device and the second protocol session message includes the information from the mobile device.

18. The non-transitory computer-readable medium of claim 16, further comprising instructions to cause the computer to:
   resend the first protocol session message to the mobile device if neither the acknowledgement from the mobile device in response to the first protocol session message nor the second protocol session message is received by the mobile device prior to expiration of a retransmission timer.

19. The non-transitory computer-readable medium of claim 16, further comprising instructions to cause the computer to:
   compare a first transaction ID associated with the first protocol session message to a second transaction ID associated with the second protocol session message, and
   exit the wait-for-acknowledgement state responsive to receiving the second protocol session message only if the first transaction ID matches the second transaction ID.

20. The non-transitory computer-readable medium of claim 16 wherein the first protocol session message is an LTE Positioning Protocol (LPP) Provide Assistance Data message and the second protocol session message is an LPP Provide Location Information message.

* * * * *